(12) United States Patent
Sanil et al.

(10) Patent No.: US 12,266,246 B2
(45) Date of Patent: Apr. 1, 2025

(54) SELF-CHECKOUT VERIFICATION SYSTEMS AND METHODS

(71) Applicant: DeepNorth Inc., Redwood City, CA (US)

(72) Inventors: Rohan Sanil, Fremont, CA (US); Abhijit Deshpande, Plano, TX (US); Jinjun Wang, San Jose, CA (US)

(73) Assignee: DeepNorth Inc., San Carlos, CA (US)

( * ) Notice: Subject to any disclaimer, the term of this patent is extended or adjusted under 35 U.S.C. 154(b) by 0 days.

(21) Appl. No.: 18/315,835

(22) Filed: May 11, 2023

(65) Prior Publication Data

US 2023/0368625 A1 Nov. 16, 2023

Related U.S. Application Data

(60) Provisional application No. 63/340,850, filed on May 11, 2022.

(51) Int. Cl.
| | | |
|---|---|---|
| *G07G 1/01* | (2006.01) | |
| *G06Q 20/20* | (2012.01) | |
| *G06T 7/10* | (2017.01) | |
| *G06T 7/70* | (2017.01) | |
| *G06V 10/70* | (2022.01) | |
| *G06V 20/52* | (2022.01) | |
| *G06V 40/10* | (2022.01) | |
| *G07G 1/00* | (2006.01) | |

(52) U.S. Cl.
CPC ............. *G07G 1/01* (2013.01); *G06Q 20/208* (2013.01); *G06T 7/10* (2017.01); *G06T 7/70* (2017.01); *G06V 10/70* (2022.01); *G06V 20/52* (2022.01); *G06V 40/10* (2022.01); *G07G 1/0036* (2013.01); *G06T 2207/10016* (2013.01); *G06T 2207/20132* (2013.01); *G06T 2207/30232* (2013.01); *G06T 2207/30242* (2013.01)

(58) Field of Classification Search
USPC ........................................................ 235/383
See application file for complete search history.

(56) References Cited

U.S. PATENT DOCUMENTS

| | | | |
|---|---|---|---|
| 11,475,496 B1* | 10/2022 | Abdul Kadar ..... | G06Q 30/0631 |
| 2020/0151696 A1* | 5/2020 | Plocher ................ | G07G 1/0036 |
| 2020/0286058 A1* | 9/2020 | Edwards ................ | G06V 20/52 |

(Continued)

*Primary Examiner* — Michael G Lee
*Assistant Examiner* — David Tardif
(74) *Attorney, Agent, or Firm* — David R. Stevens; Stevens Law Group

(57) ABSTRACT

Self-checkout verification systems and methods are described. One aspect includes receiving a plurality of images from a camera, the images being associated with a customer self-checkout process. The images may be analyzed to detect one or more items in possession of the customer, count a first number of the items, categorize each item, and construct a first category set including the categorizing for all the items. One aspect includes receiving a point-of-sale record at a completion of the self-checkout process, the point-of-sale record including a second number of the items and a second category set including the categorizing for all the items. The first number and the second number, and the first category set and the second category set may be compared. An alert may be generated if there is a discrepancy between the first number and the second number, or the first category set and the second category set.

24 Claims, 20 Drawing Sheets

(56) References Cited

U.S. PATENT DOCUMENTS

2022/0194454 A1* 6/2022 Carter ................... B62B 5/0423
2022/0414632 A1* 12/2022 O'Herlihy ............ G07G 1/0063
2023/0120798 A1* 4/2023 Palande ................ G06V 10/25
705/23

* cited by examiner

SELF-CHECKOUT VERIFICATION SYSTEMS AND METHODS

RELATED APPLICATION

This application claims the priority benefit of U.S. Provisional Application Ser. No. 63/340,850, entitled "A Computer Vision-Based Method to Verify Self-Checkout Accuracy," filed May 11, 2022, the disclosure of which is incorporated by reference herein in its entirety.

BACKGROUND

Technical Field

The present disclosure relates to systems and methods that implement a computer vision-based method to verify self-checkout accuracy.

BACKGROUND ART

In the retail world, shrinkage, or shrink (a reduction in inventory due to shoplifting), is a big issue for store owners. Retail shrink is rising at a fast clip; with losses attributable to shoplifting, theft by store workers and organized retail crime amounting to $61.7 billion in 2019. This number represents a more than 20% increase from $50.6 billion in 2018, according to figures released in July 2020 by the National Retail Federation. Put another way, shrink ate up 1.62% of retail sales in 2019 compared with 1.38% in 2018. Among different types of shoplifting, some self-checkout customers may leave unscanned items in their baskets either inadvertently or on purpose. Others use "the banana trick," such as putting in an inexpensive produce code when scanning a more expensive item such as a meat item. Although some retailers have cut back on self-checkout lanes, the number of self-checkout terminals worldwide is growing. Consulting firm RBR said a record 49,000 self-checkout terminals were delivered to retailers in 2016 and expects over 400,000 self-checkout terminals to be deployed in over 60 countries by 2022. For years, checkout losses cost as much as $45.2 billion a year.

SUMMARY

Aspects of the invention are directed to systems and methods for applying a computer vision method to automatically analyzing an accuracy of a self-checkout process.

One method to implement such a system includes receiving a plurality of images from an imaging system (e.g., a camera). The images may be associated with imaging a customer checkout (i.e., a self-checkout) process. A computer vision system may be configured to analyze the images. The analysis may include detecting one or more items in possession of the customer. In one aspect, the items are located in a container associated with the customer or in one or both hands of the customer. The analysis may also include counting a first number of the items, categorizing each item, and constructing a first category set including the categorizing for all the items.

In one aspect, the method receives a point-of-sale record at a completion of the self-checkout process. The point-of-sale record may include a second number of the items and a second category set including the categorizing for all the items. The method may compare the first number and the second number, and the first category set and the second category set, and generate an alert if there is a discrepancy between the first number and the second number, or between the first category set and the second category set.

Other aspects include apparatuses that implement the above method.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
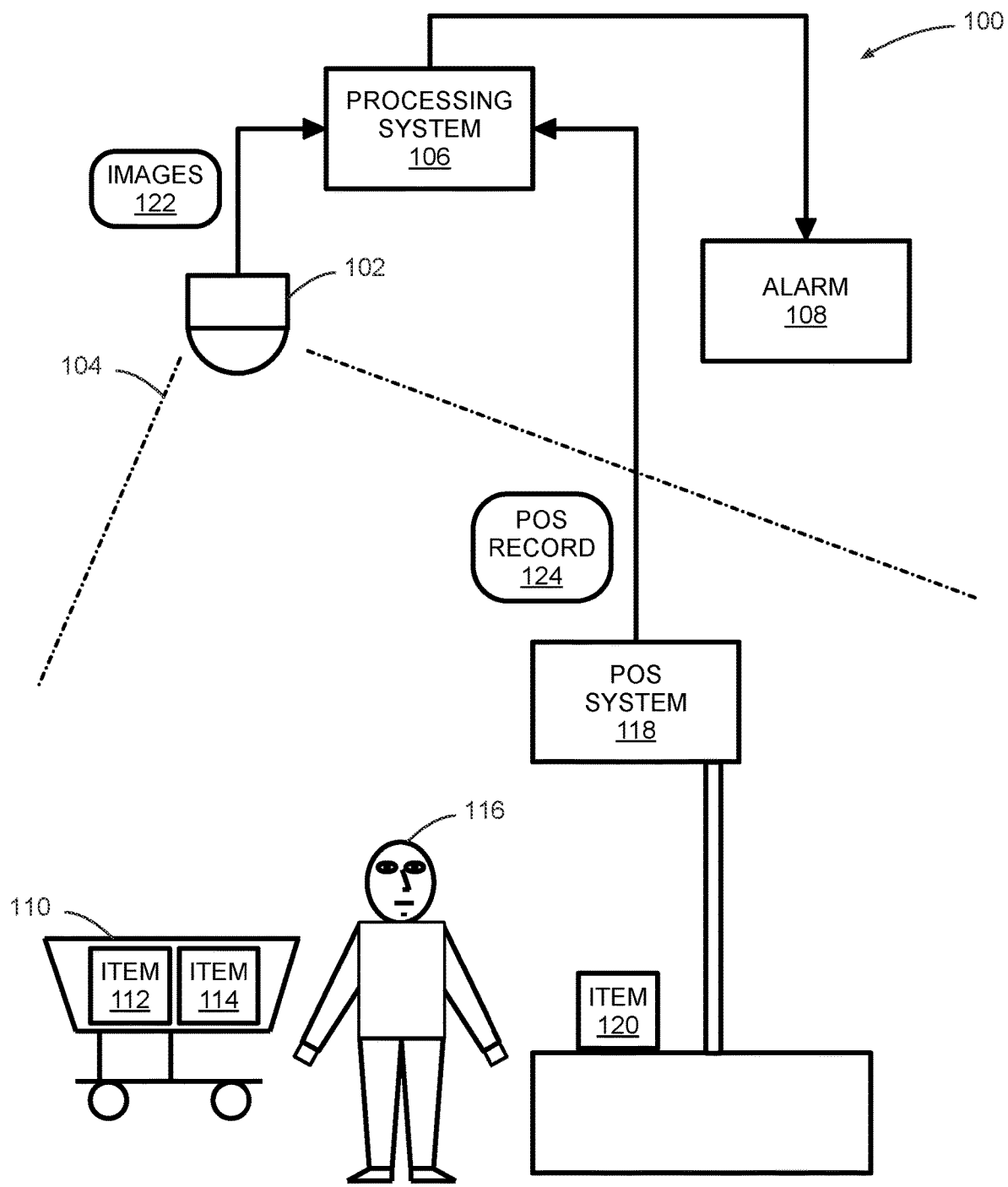
FIG. 1 is a block diagram depicting an embodiment of a self-checkout verification system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention are directed to systems and methods for implementing a self-checkout verification system using artificial intelligence (AI) and/or machine learning (ML) and/or computer vision (CV) algorithms operating on one or more images of the self-checkout process. One aspect uses an overhead camera mounted above each self-checkout lane in, for example, a grocery store. This system applies computer vision-based technology to automatically count a number of goods (items) a current transaction involves. The system may first detect a start and an end of each transaction by a customer. During each transaction, the system may detect goods either in the customer's hand or their shopping cart from each frame. The system may also maintain a track of a temporal history of a number of goods in every frame. After the end of transaction, the system may output a total number of goods and a major type of goods in the transaction. A store owner or employee can compare this information with an associated point-of-sale (POS) data set to verify if the purchased goods as indicated in the POS data match the actual goods the customer has physically checked out.

Overall, shrinkage is a significant concern for retailers, and addressing it requires a combination of preventative measures, such as computer vision-based product detection and identification, inventory control, and employee training. Retailers must stay vigilant and take proactive steps to prevent shrinkage to protect their profitability and ensure the long-term success of their business.

FIG. 1 is a block diagram depicting an embodiment of a self-checkout verification system 100. As depicted, self-checkout verification system includes processing system 106, camera 102, alarm 108, and point-of-sale system (POS system 118). Self-checkout verification system 100 may be installed in a store such as a grocery store or a department store, where customers have an option to perform a self-checkout (as opposed to a cashier-assisted checkout).

In one aspect, customer 116 engages in a self-checkout process, where customer 116 wishes to check out items 112, 114, and 120. One or more of these items may be placed in shopping cart 110, or some other shopping container (e.g., a shopping bag or a shopping basket). Some items may also be held in one or both hands of customer 116. Customer 116 may physically perform a self-checkout process by placing items 112, 114 and 120 on POS system, and/or using a handheld scanner to scan the items.

In one aspect, camera 102 is configured such that an associated field-of-view 104 captures shopping cart 110 and all items within the shopping cart (e.g., items 112 and 114), customer 116, and item 120. In other words, field-of-view 104 includes the shopping container the customer, and all items that the customer wishes to check out. Camera 102 may be a surveillance camera installed in the store. Camera 102 may be specifically mounted on a ceiling, a beam, or some other supporting structure, in an orientation that sufficiently captures all the necessary aspects of the self-checkout process in the corresponding field-of-view.

In one aspect, camera 102 is configured to generate one or more images (e.g., a temporal image sequence or a video stream comprising one or more sequential video frames) that capture the self-checkout process being performed by customer 116. In one aspect, camera 102 is an existing surveillance camera installed in a store such as a grocery store. Camera 102 can generate a video stream and/or a plurality of temporal image/video frames, transmitted to processing system 106 as images 122.

In one aspect, the images 122 generated by camera 102 are received by processing system 106. Processing system 106 may run one or more artificial intelligence, machine learning or computer vision algorithms to detect, identify and categorize items 112, 114, and 120. Processing system 106 may also compute a total number of items being checked out by customer 116 (i.e., the first number of items). Processing system may also generate a category set that includes the categorization of items 112, 114, and 120. For example, in a grocery store an itemization and categorization process based on AI/ML/CV algorithms may include:

1 bag russet potatoes (produce)
2×1-gallon whole milk jugs (dairy)
1 lb. boneless skinless chicken thighs package (meat)
1 lb. Red Delicious apples (produce)

In general, processing system 106 counts a first number of the items, identifies each item using artificial intelligence, categorizes each item, and constructs a first category set including the categorizing for all the items.

Once the self-checkout process (transaction) is complete, POS system 118 may generate and send a point-of-sale (POS) completion record (POS record) 124 to processing system 106. POS completion record 124 may include an itemized list of items checked out by customer 116. In one aspect, POS completion record 124 includes a second number of the items and a second category set generated by POS system 118. In another aspect, processing system 106 generates the second number of the items and the second category set based on data contained in POS completion record 124.

In one aspect, camera 102 may capture an image of a receipt in a hand of customer 116 at the end of the self-checkout transaction. Processing system 106 may receive this image and detect the receipt in the image using one or more AI/ML/CV algorithms. Processing system 106 may then use these algorithms to perform text recognition in the image to generate a third number of items and a third category set.

In one aspect, processing system 106 compares the first number of items and the second number of items, and the first category set and the second category set. Processing system may also include the third number of items and the third category set in the comparison. If there is a discrepancy between either number or category set, processing system can alert store employees via alarm 108. Alarm 108 may be an audio-visual alert (e.g., a flashing light or an alarm on POS system 118). Alarm 108 may also be implemented as an alert message transmitted to a check stand terminal, a mobile device, a tablet, or a computing device associated with a store employee.

For example, if the first number and the second number match, but the second category set does not show the meat item while the first category set does, then this might indicate that the customer has not scanned the meat item. Instead, the customer might have scanned a less expensive item twice to reduce the total amount of the bill. In this case, a store employee, upon being alerted via alert/alarm 108, can physically correlate the items being carried out by the customer with the associated sales receipt to determine and identify the discrepancy.

Figure 2:
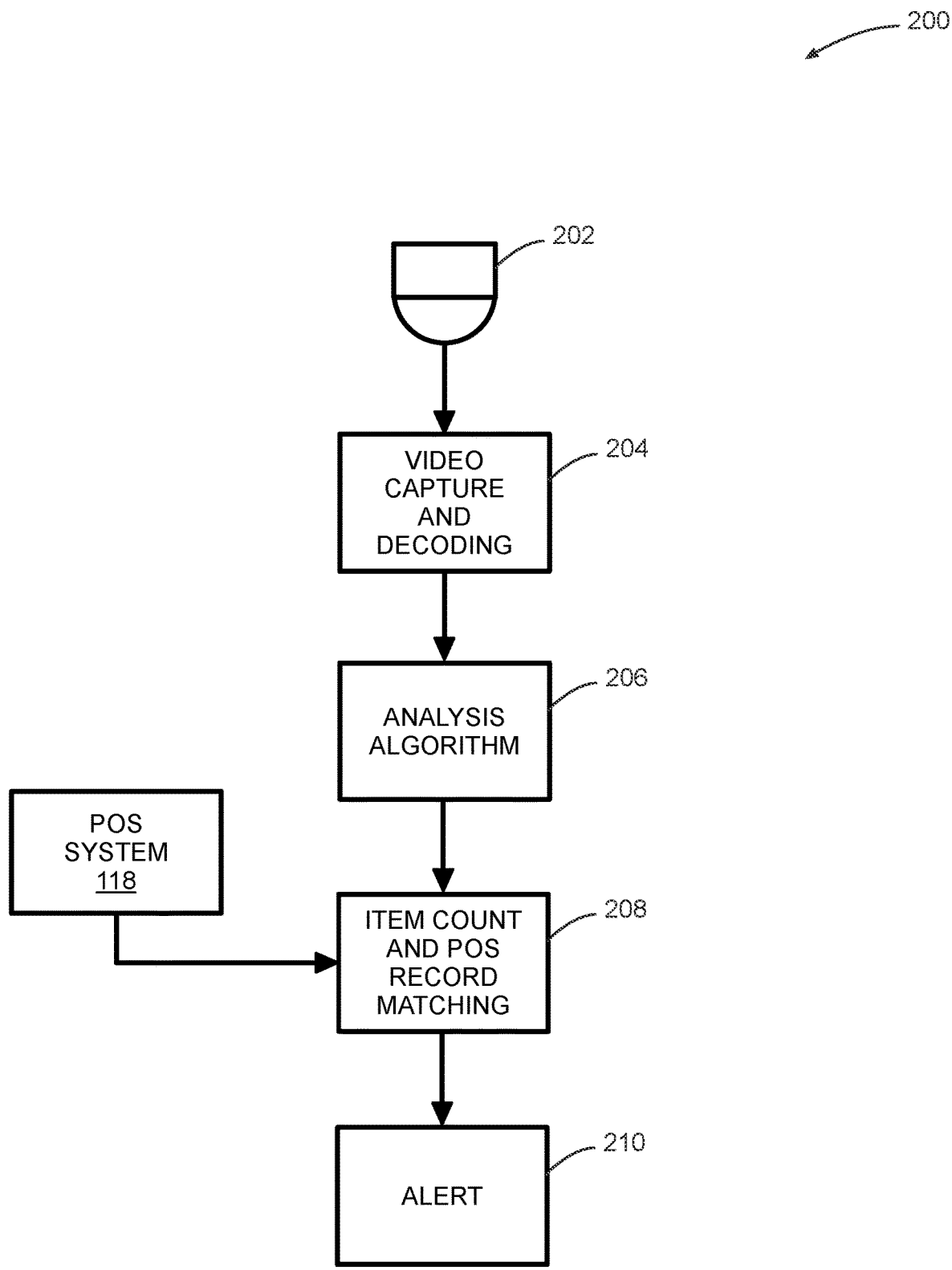
FIG. 2 is a flow diagram depicting a self-checkout verification method.

FIG. 2 is a flow diagram depicting a self-checkout verification method 200. As depicted, camera 202 (similar to camera 102) performs video capture and decoding 204. Alternatively, the decoding process may be performed by processing system 106. Captured and decoded video and/or corresponding image frames may be transmitted to computing system 106, which implements analysis algorithm 206. Analysis algorithm 206 may perform operations such as hand detection for the customer and cart detection in the image frames, to detect and identify one or more items present in the customer's hand and/or cart. Analysis algorithm 206 generate an itemized list and category set for the items. This corresponds to the first number of items and the first category set.

In one aspect, upon completion of the transaction, processing system 106 receives POS completion record 124 from POS system 118. POS completion record 124 is processed by processing system 106 to generate to the second number of items and the second category set.

Item count and POS record matching 208 may be implemented on processing system 106 to compare the first and second number of items, and the first and second category sets. If there is any discrepancy between either the first and the second number or between the first and the second category sets, processing system 106 issues/generates alert 210.

Figure 3:
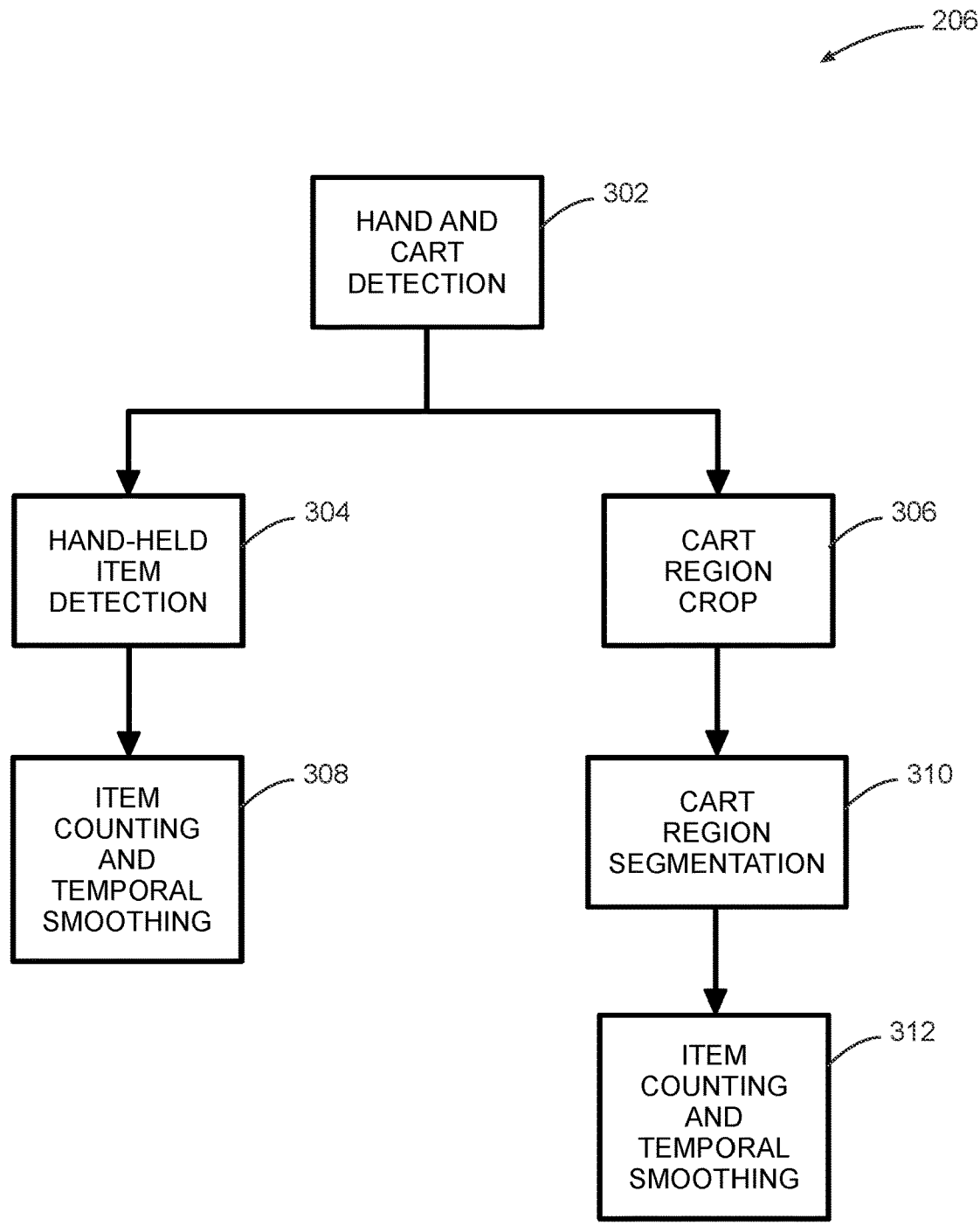
FIG. 3 is a flow diagram depicting an analysis algorithm.

FIG. 3 is a flow diagram depicting analysis algorithm 206. Analysis algorithm 206 may be implemented on processing system 106, and may include AI/ML/CV algorithms to perform hand and cart detection 302, on images 122. Analysis algorithm may perform hand-held item detection 304, to detect and identify one or more items in one or both hands of customer 116 as present in images 122. For example, analysis algorithm 206 may identify and track one or more items in a hand/hands of customer 116 while customer 116 performs the self-checkout process. Analysis algorithm 206 may then perform item counting and temporal smoothing (filtering) 308, to determine a number of items in the customer's hand(s).

Analysis algorithm 206 may detect cart 110 and perform a cart region crop 306 in an image. Cart region crop 306 may include cropping an image so that it includes only a portion of the image that includes cart 110. Analysis algorithm 206 may then perform cart region segmentation to detect and identify one or more items in cart 110. Item counting and temporal smoothing 312 may determine a number of items in cart 110.

In one aspect, self-checkout verification system 100 determines the number of items a customer buys by counting the items in the cart or in the customer's hand(s). One possible implementation may include the following characteristics:

1) A camera (e.g., camera 102) is installed above a self-checkout counter, and one or more pictures and/or video are captured for each of the cart and shopper (customer). In one aspect, images and videos can be saved at the same time when an alarm occurs (e.g., when processing system 106 triggers or generates alarm 108), providing evidence for product loss prevention.

2) Computer vision algorithms may be implemented on processing system 106 to recognize one or more items in cart 110 or in a hand/hands of customer 116. Such algorithms may also track a start time to a finish time of each self-checkout transaction. This further provides improved time accuracy.

3) Based on a counted number of items, match the number to a POS record generated by POS system 118 within the same time window.

4) Processing system 106 may issue different alerts depending on a relationship between the first number of items and the second number of items. If the first number of items is greater than the second number of items, this suggests that the number of items detected by self-checkout verification system 100 is greater than the actual number of items that have been checked out via POS system 118, provided via POS record 124. This may suggest that customer has not scanned one or more items. This may further suggest that the customer made a mistake or may be trying to sneak the items out without paying for them. Processing system 106 may then trigger alarm 108 as a red alert.

On the other hand, if the first number of items is less than the second number of items, this suggests that the number of items detected by self-checkout verification system 100 is less than the actual number of items that have been checked out via POS system 118, provided via POS record 124. This may suggest that customer might have made a mistake in scanning items during checkout, possibly scanning one or more items multiple times. Processing system 106 may then trigger alarm 108 as a yellow alert.

If the first number of items and the second number of items is equal, then the numbers are consistent, and alarm 108 may be a green alert, or not triggered at all.

A target segmentation algorithm implemented on processing system 106 can detect and identify the hand of customer 116 and shopping cart 110 at the same time with a high degree of accuracy. The algorithm can combine the POS data and the number of goods to make a real-time alarm judgment.

Processing system 106 can also compare the first category set to the second category set. For example, if the first category set shows a meat item that is not present in the second category set but the first number and the second number are the same, this may suggest that the customer might have scanned a lower-priced item as compared to the meat item twice to reduce their bill. Processing system 106 can trigger a red alert accordingly.

Figure 4:
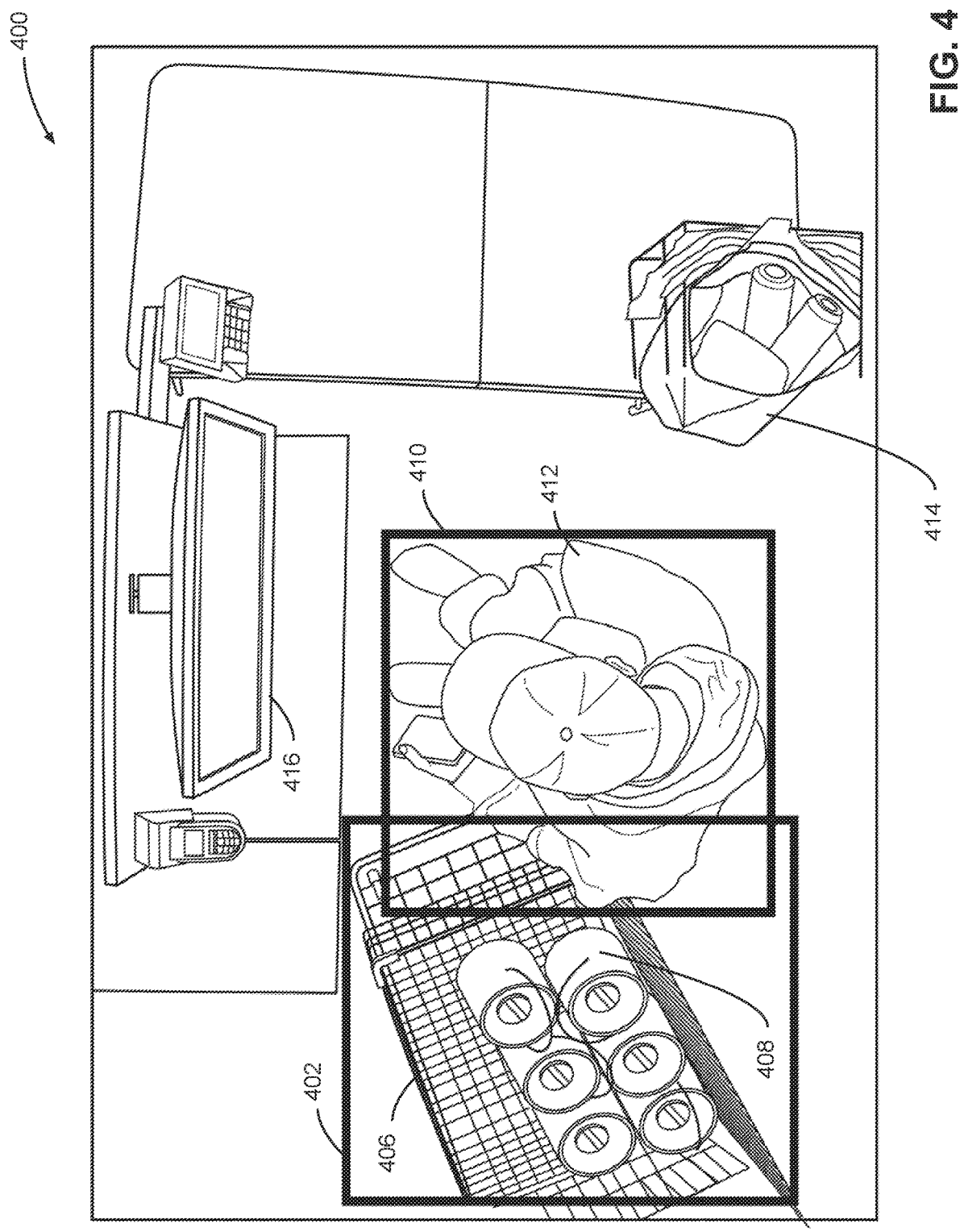
FIG. 4 is a camera image processed by a self-checkout verification system.

FIG. 4 is a camera image 400 processed by self-checkout verification system 100. Image 400 may be generated by camera 102, and transmitted to processing system 106 as images 122. As depicted, image 400 includes POS system 416 (similar to POS system 118). Image 400 also includes customer 412 (similar to customer 116), and shopping cart 406 (similar to shopping cart 110). Shopping cart 110 includes a plurality of items, e.g., item 408. Image 400 also includes checked out items 414.

In one aspect, the computer vision algorithm running on processing system 106 may detect customer 412 and shopping cart 406. Processing system 106 may use the computer vision algorithm to generate bounding boxes 402 and 410 to outline and delineate shopping cart 406 and customer 412, respectively. Processing system 106 may perform further processing on image 400.

Figure 5:
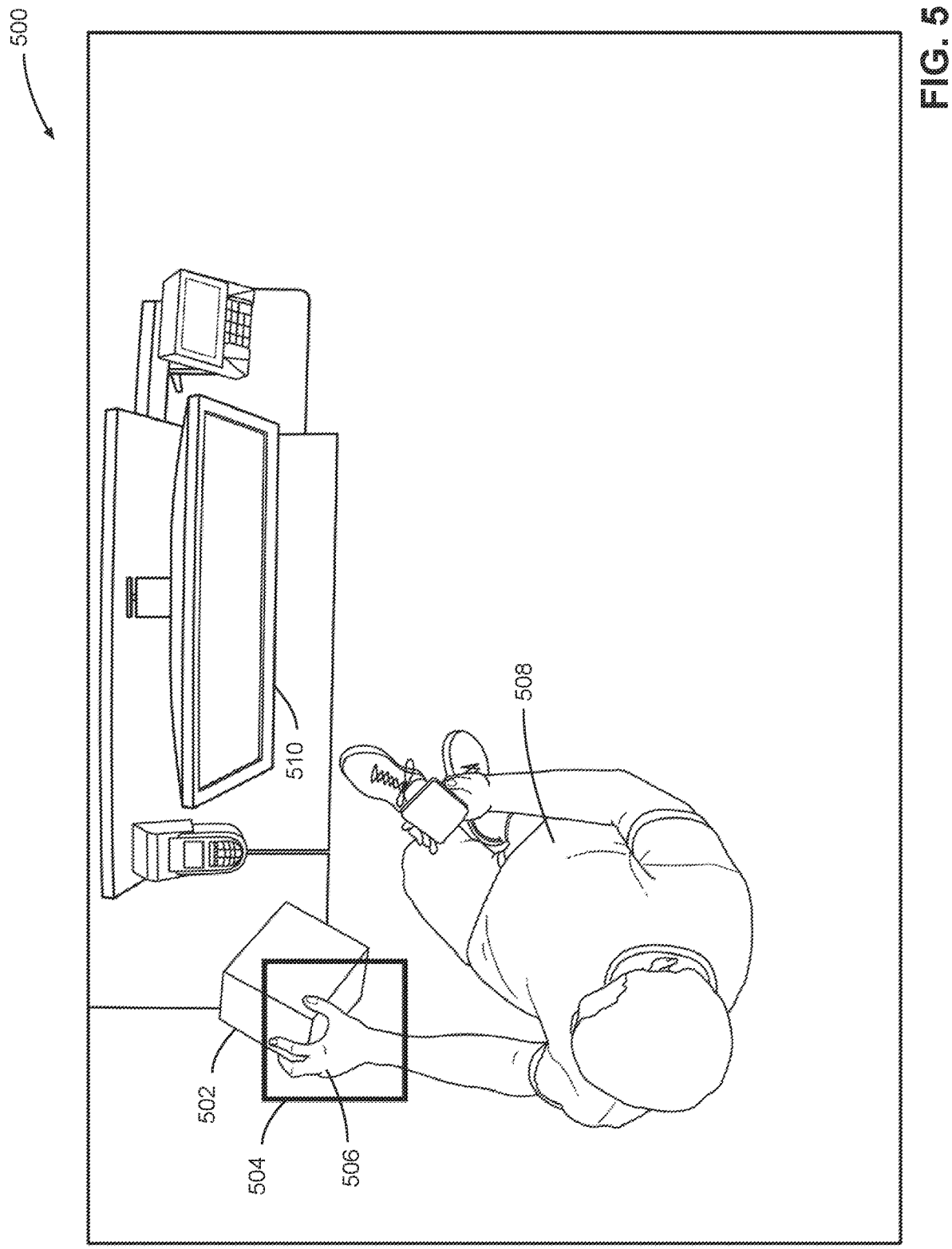
FIG. 5 is a camera image processed by a self-checkout verification system.

FIG. 5 is a camera image 500 processed by self-checkout verification system 100. Image 500 may be generated by camera 102, and transmitted to processing system 106 as images 122. As depicted, image 500 includes POS system 510 (similar to POS system 118). Image 500 also includes customer 508 (similar to customer 116). Customer 508 is seen to be holding item 502 in their hand 506. In one aspect, the computer vision algorithm running on processing system 106 may detect hand 506, and delineate hand 506 with bounding box 504. Processing system 106 may perform further processing on image 500.

Figure 6:
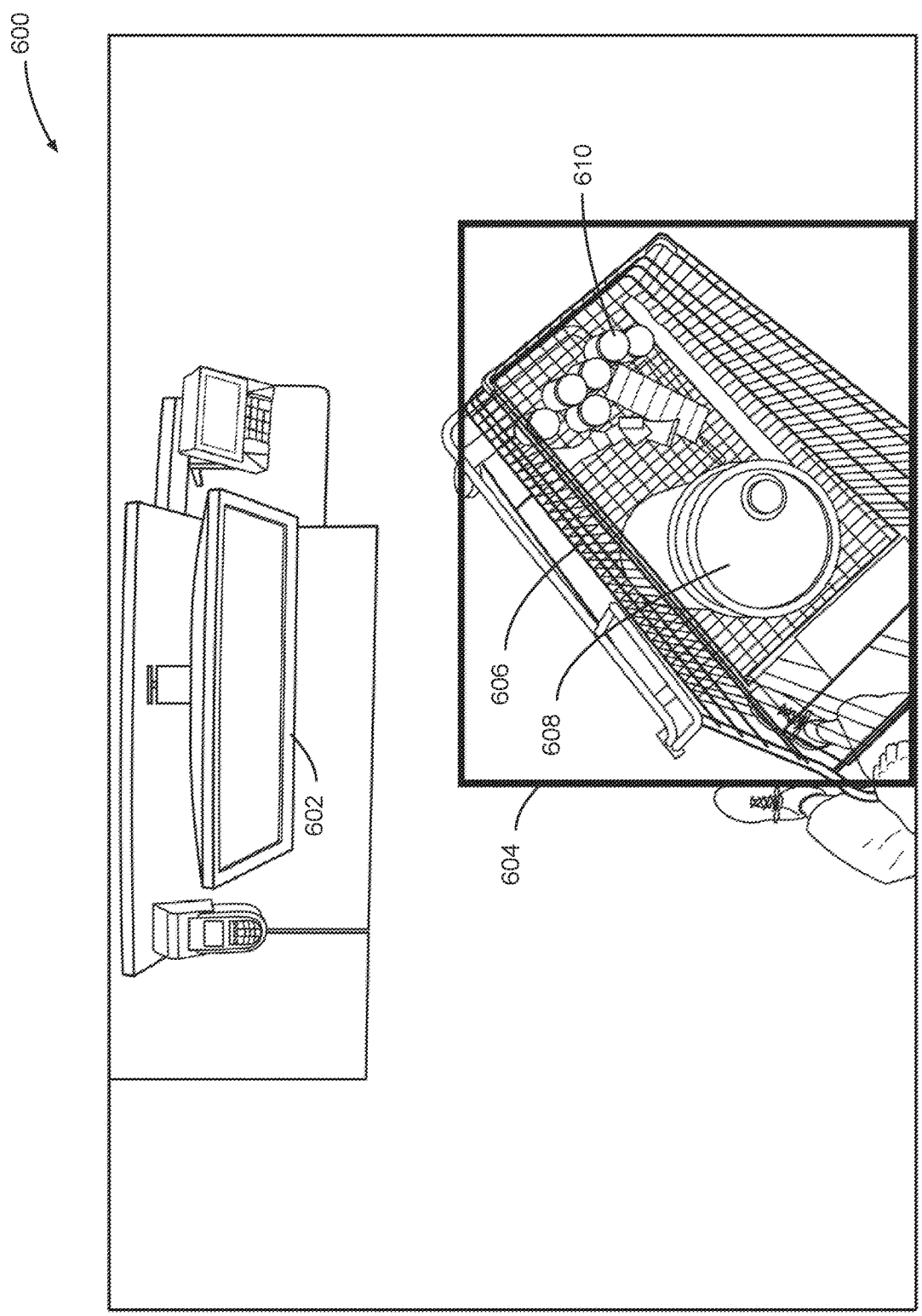
FIG. 6 is a camera image processed by a self-checkout verification system.

FIG. 6 is a camera image 600 processed by self-checkout verification system 100. As depicted, image 600 includes POS system 602 (similar to POS system 118). Image 600 also includes shopping cart 606 (similar to shopping cart 110). Shopping cart 606 may contain one or more items (e.g., items 608 and 610). In one aspect, the computer vision algorithm running on processing system 106 may detect shopping cart 606, and delineate shopping cart 606 with bounding box 604. Processing system 106 may perform further processing on image 600.

Figure 7:
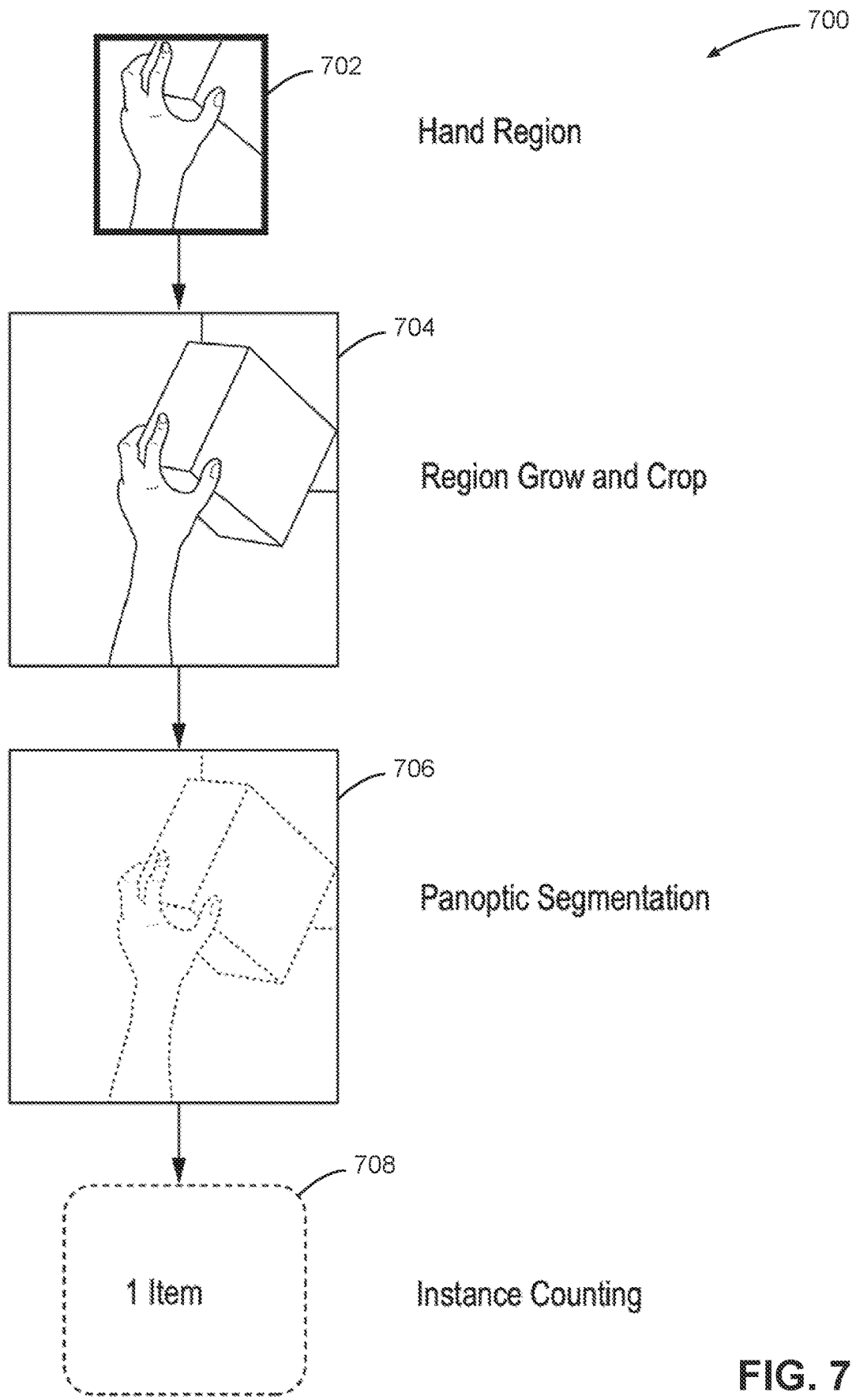
FIG. 7 is a flow diagram depicting a method for hand-held item detection.

FIG. 7 is a flow diagram depicting a method 700 for hand-held item detection. Method 700 may include detecting a hand region with a bounding box (702). For example, computing system 106 may detect a hand region associated with hand 506 using bounding box 504. Method 700 may include a region grow and crop (704), where bounding box 504 is expanded to include item 502 being held by customer 508. Method 700 may then perform panoptic segmentation on the expanded bounding box (706), and then perform instance counting (708). In this example, the customer is holding one item in their hand; hence the first number of items is incremented by one.

Figure 8:
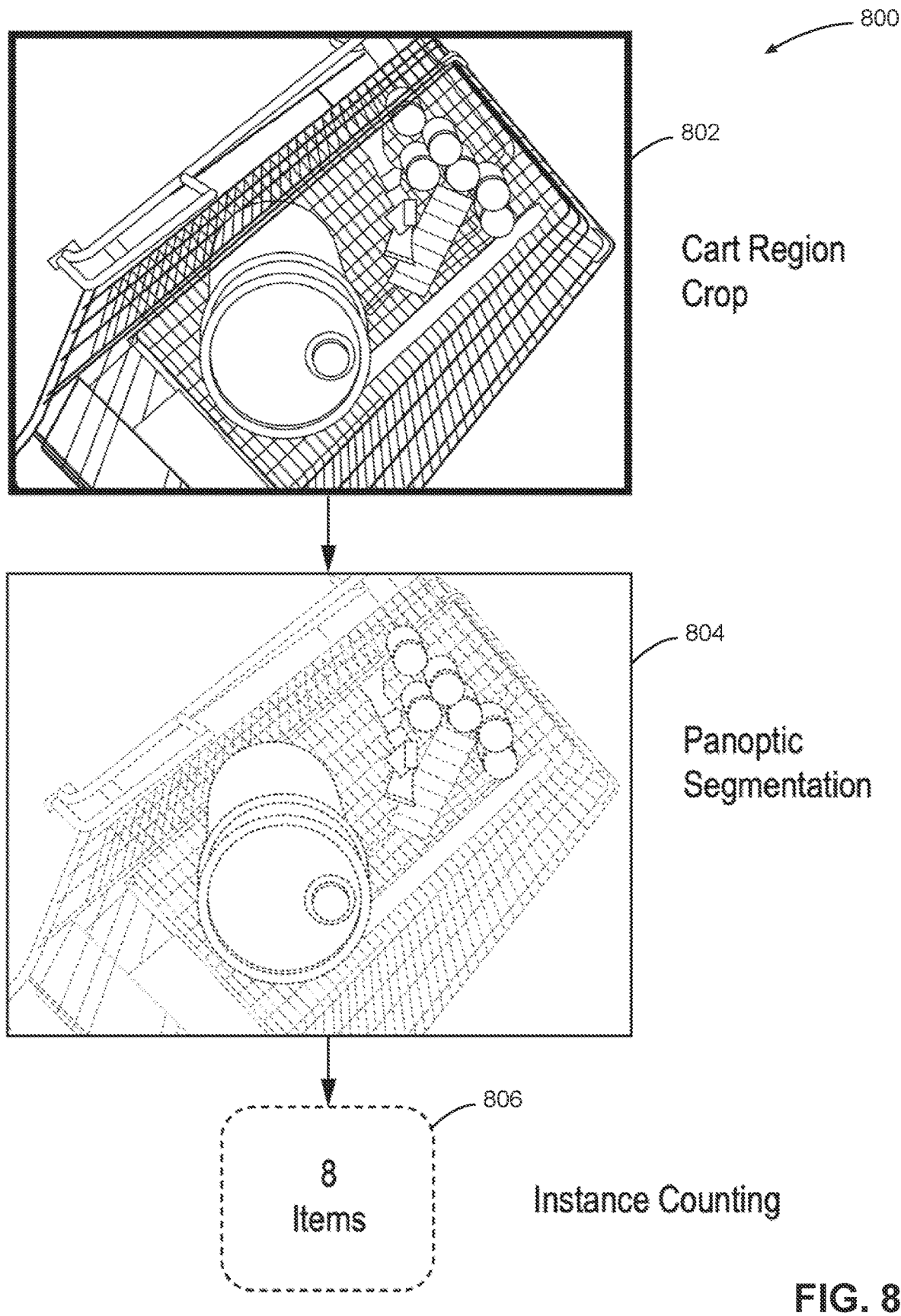
FIG. 8 is a flow diagram depicting a method for shopping cart region segmentation.

FIG. 8 is a flow diagram depicting a method 800 for shopping cart region segmentation. As depicted, method 800 includes performing a cart region crop (802). For example, processing system 106 may crop image 600 to an area covered by bounding box 604. Method 800 may include performing panoptic segmentation on the cropped image (804). Method 800 may next perform instance counting (806) to determine a number of items in shopping cart 606. In this example, shopping cart 606 includes multiple items. A number of items in shopping cart 606 is counted by the computer vision algorithm running on processing system 106, and this number is used to increment the first number of items.

Figure 9:
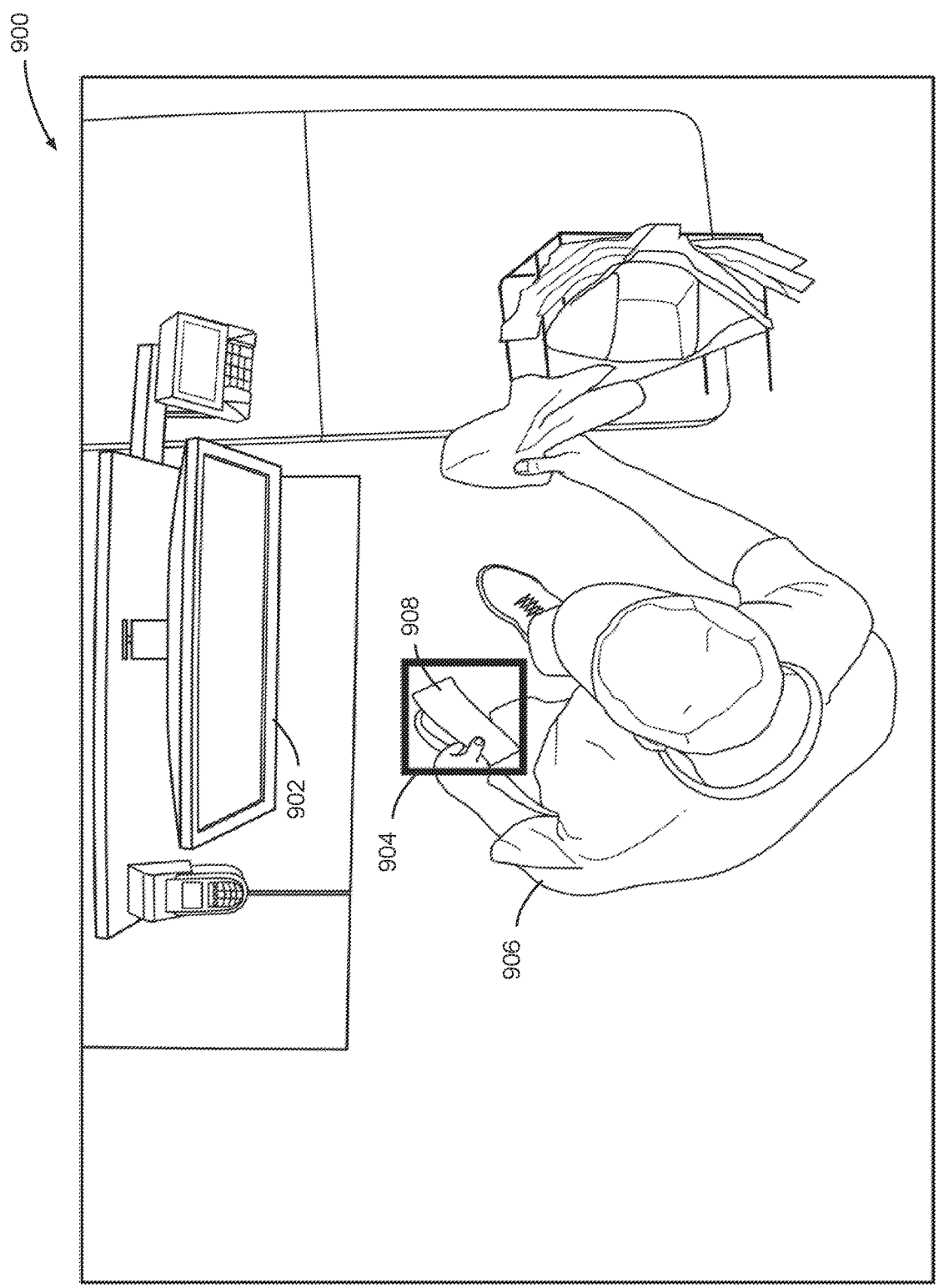
FIG. 9 is a camera image processed by a self-checkout verification system.

FIG. 9 is a camera image 900 processed by a self-checkout verification system. As depicted, image 900 includes POS system 902 (similar to POS system 118). Image 900 also includes customer 906, holding receipt 908. Image 900 may be captured at a time when customer 906 has completed a self-checkout process, and is holding a final receipt (i.e., receipt 908) in their hand. A computer vision algorithm running on processing system 106 may detect the customer's hand and receipt 908, and delineate receipt 908 with bounding box 904.

In one aspect, the computer vision algorithm may perform text recognition on receipt 908, to generate a list of items (including, for example, the third number of items and the third category set). This list of items may be used by self-checkout verification system 100 to verify the self-checkout process.

Figure 10:
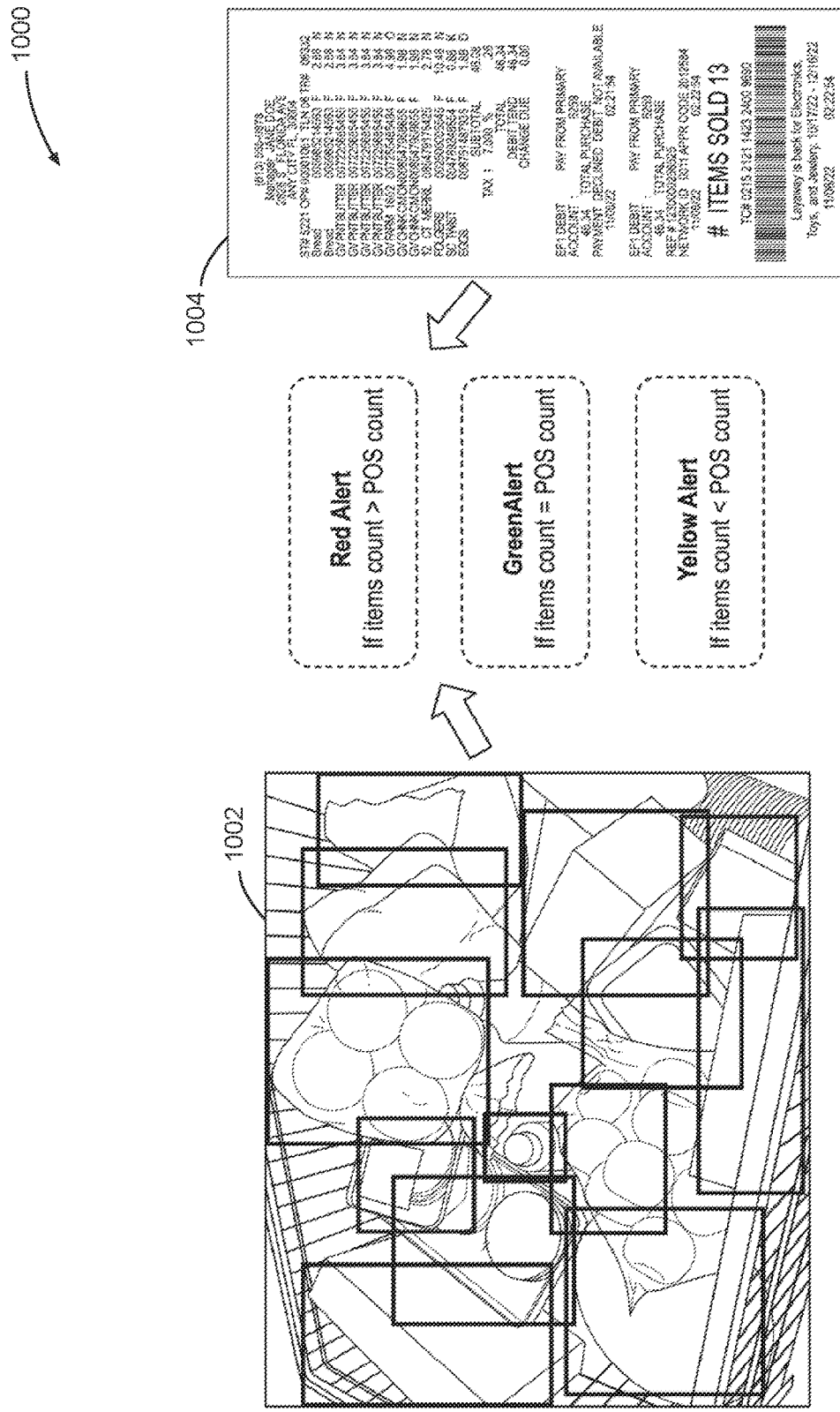
FIG. 10 is a schematic diagram depicting a self-checkout verification process.

FIG. 10 is a schematic diagram depicting a self-checkout verification process 1000. In one aspect, self-checkout verification process 1000 may be implemented on processing system 106. As depicted, self-checkout verification process 1000 includes image 1002. Image 1002 may be a crop of an image that includes a shopping cart. Image 1002 may alternatively be an image of a customer's hand. Processing system 106 runs a computer vision algorithm on image 1002. This computer vision algorithm may identify and count one or more items in image 1002, and delineate the items with bounding boxes, as depicted in FIG. 10. In one aspect, self-checkout verification process 1000 generates the first number of items and the first category set based on the information derived from image 1002.

In one aspect, self-checkout verification process 1000 (e.g., processing system 106) may analyze receipt 1004. Receipt 1004 may be received or extracted from POS record 124, or may be generated by scanning and analyzing receipt 908. An analysis of receipt 1004 may be used to generate the second and/or third number of items, and the second and/or the third category sets. Self-checkout verification process 1000 may compare the first number of items with the second and/or third number of items, and the second category set with the second and/or third category set.

If the first number of items is greater than the second/third number of items, then self-checkout verification process 1000 generates a red alert, since this may suggest that the customer may have not scanned one or more items during checkout, and may be trying to take these items from the store without paying for them. If the first number of items is equal to the second/third number of items, then self-checkout verification process 1000 generates a green alert, signifying that everything is consistent, and there is no cause for concern. If the first number of items is less than the second/third number of items, then self-checkout verification process 1000 generates a yellow alert, which suggests that the customer might have scanned the same item multiple times, and may be overpaying for their purchase. One or more store employees may be alerted about any of the red, green, and yellow alerts via alarm 108. Alarm 108 may be transmitted to a check stand terminal, a mobile device, a tablet, or a computing device associated with a store employee.

Figure 11A:
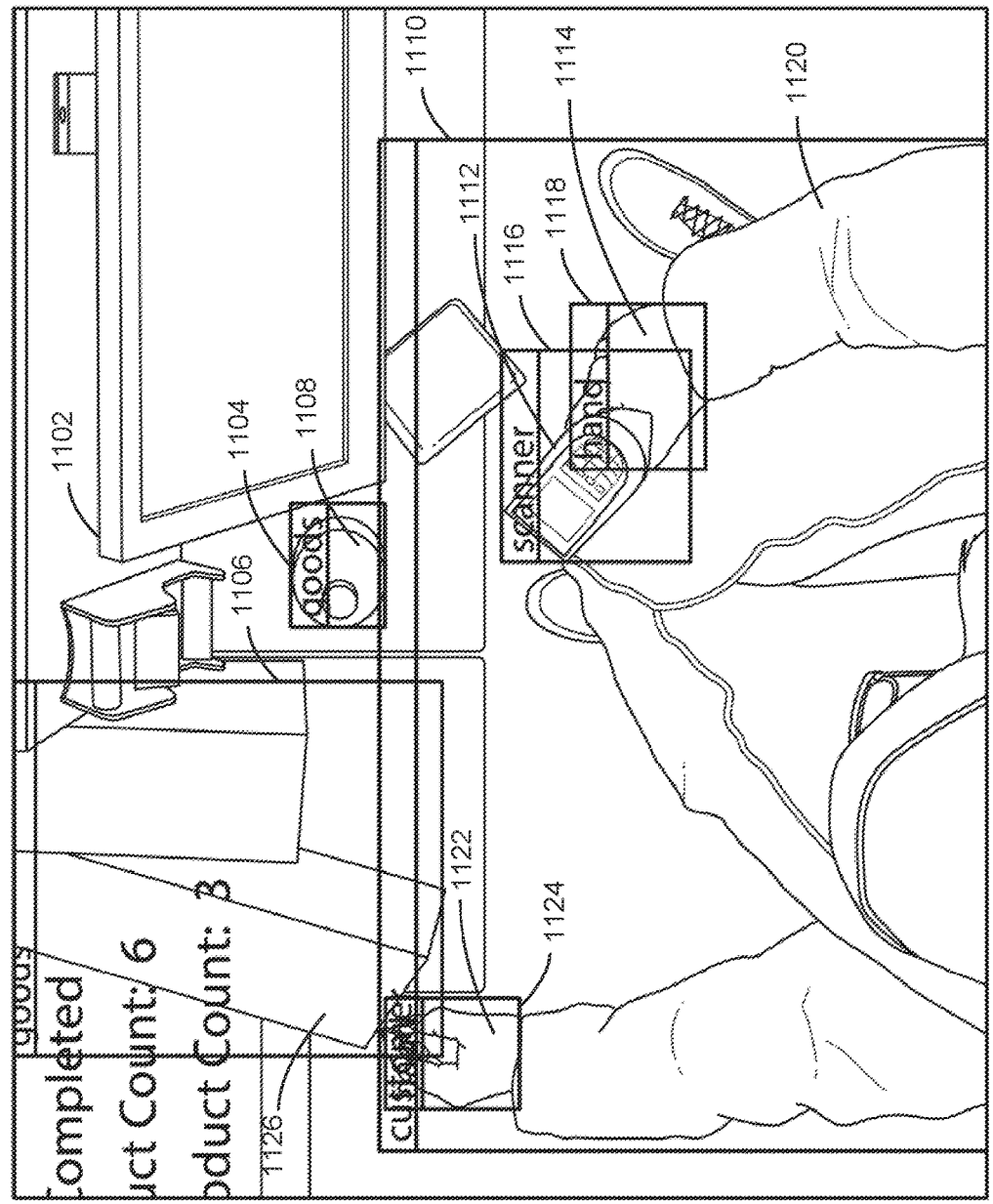
FIGS. 11A and 11B are renditions of a camera image processed by a self-checkout verification system.

FIG. 11A is a rendition of a camera image 1100 processed by self-checkout verification system 100. Camera image 1100 may be generated by camera 102, and transmitted to processing system 106 as a part of images 122. As depicted, camera image 1100 shows customer 1120 (similar to customer 116). Image 1100 also depicts left hand 1122 and right hand 1114 of customer 1120.

In one aspect, customer 1120 engages in a self-checkout process at POS system 1102. Customer 1120 may use handheld scanner 1112 to scan, for example, item 1126 and 1108 as a part of the self-checkout process.

One or more AI/ML/CV algorithms running on processing system 106 may analyze camera image 1100 to detect and identify different features in camera image 1100. For example, processing system 106 may detect item 1126 and delineate item 1126 with bounding box 1106. Processing system 106 may also detect customer 1120, left hand 1122, and right hand 1114. Processing system 106 may delineate customer 1120, left hand 1122, and right hand 1114 by bounding boxes 1110, 1124, and 1118, respectively. Processing system 106 may detect handheld scanner 1122 and delineate handheld scanner by bounding box 1116. Handheld scanner 1122 may be used by customer 1120 to scan one or more items as a part of the self-checkout process.

In one aspect, processing system 106 labels the corresponding bounding boxes as:
  Bounding box 1124: hand
  Bounding box 1106: goods
  Bounding box 1104: goods
  Bounding box 1110: customer
  Bounding box 1116: scanner
  Bounding box 1118: hand.

Figure 11B:
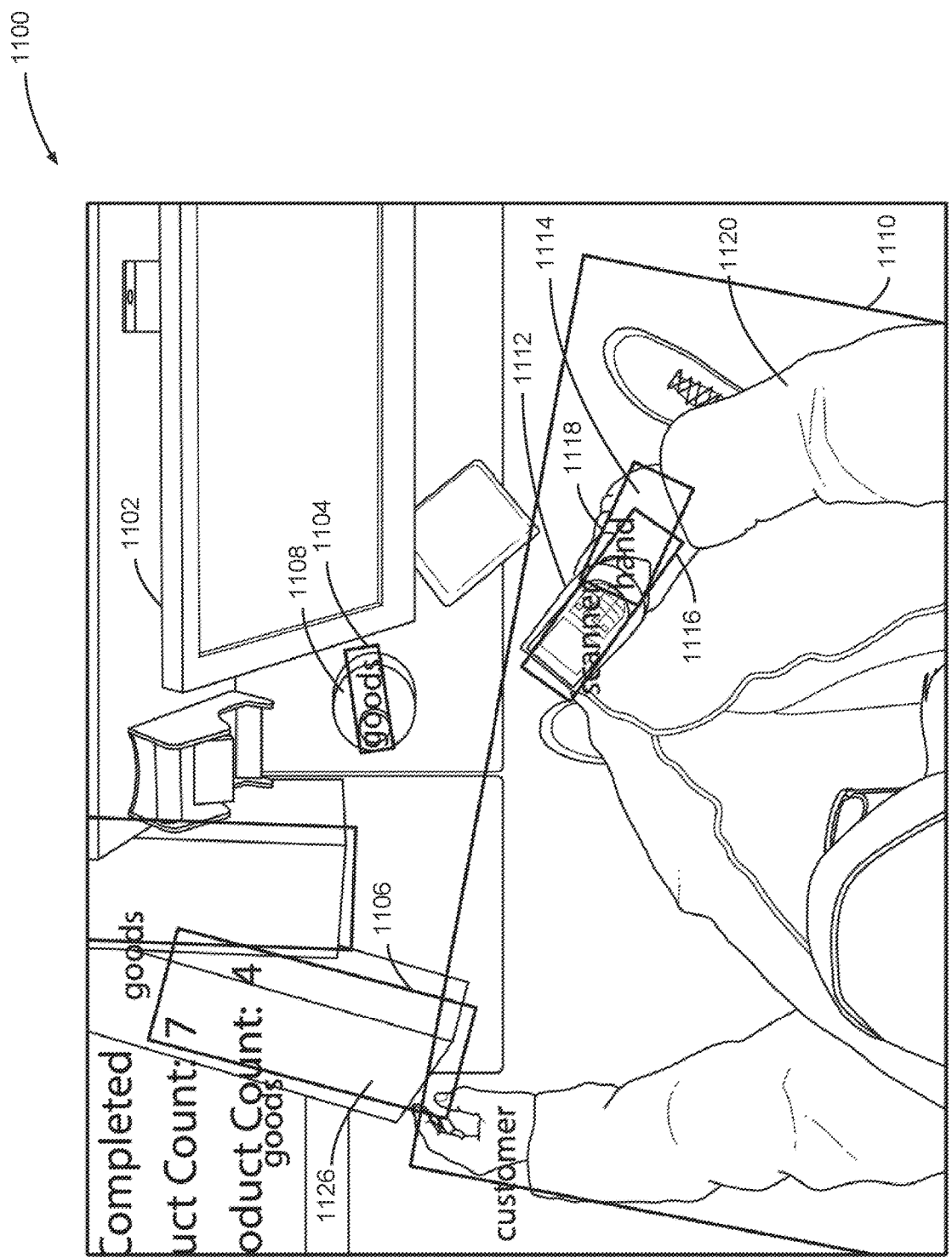

In one aspect, processing system 106 may label each bounding box accordingly. Once processing system 106 delineates relevant features in image 1100, processing system 106 may perform further processing that reorients the bounding boxes to better conform to a geometric shape of each object as rendered in camera image 1100. This aspect is depicted in FIG. 11B. In FIG. 11B, computing system 106 rotates bounding boxes 1106 and 1104 to better align with respective geometric orientations of the items 1126 and 1108. Processing system 106 also rotates bounding boxes 1116, 1118 and 1110 to better align with respective geometric orientations of scanner 1112, right hand 1114, and customer 1120.

Figure 12:
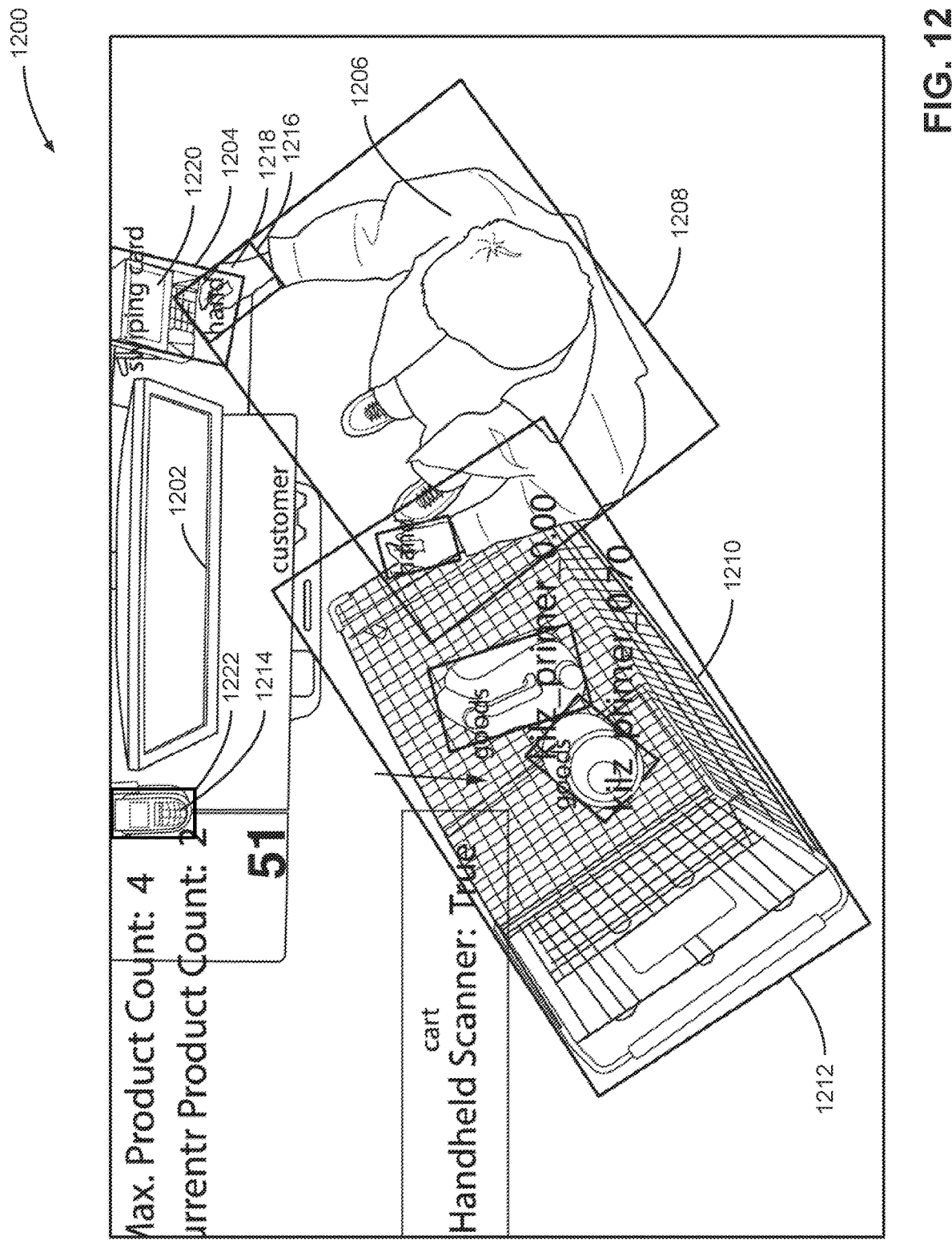
FIG. 12 is a camera image processed by a self-checkout verification system.

FIG. 12 is a camera image 1200 processed by a self-checkout verification system. Camera image 1200 depicts customer 1206 engaged in a self-checkout process at POS system 1202. Processing system 106 analyzes camera image 1200 to identify one or more features in camera image 1200, such as customer 1206, customer hand 1218, keypad 1220, scanner 1222, and shopping cart 1210. Processing system 106 may generate one or more bounding boxes and corresponding labels associated with the identified features. For example, processing system 106 may generate the following bounding boxes and labels:
  Bounding box 1204 associated with keypad 1220, with the label "swiping card" to indicate that the customer is currently completing the transaction by making a payment.
  Bounding box 1216 associated with hand 1218, with the label "hand."
  Bounding box 1208 associated with customer 1206, with the label "customer."
  Bounding box 1212 associated with shopping cart 1210, with the label "cart."
  Bounding box 1214 associated with scanner 1222, with the label "scanner."

One or more items inside shopping cart 1210 may be labeled as "goods." Processing system 106 may also include one or more labels indicating whether a handheld scanner has been used as a part of the self-checkout process (in camera image 1200, this is set to "true"). Processing system 106 may also include a label indicating a maximum product count (4 indicated in camera image 1200), and a current product count (2 indicated in camera image 1200). Processing system 106 may also determine a kind (category) of items present in shopping cart 1210 (in this case, primer).

The current and maximum product counts may be used by processing system 106 to generate the first number of items. The kind of items (i.e., primer) may be used by processing system to generate the first category set.

Figure 13:
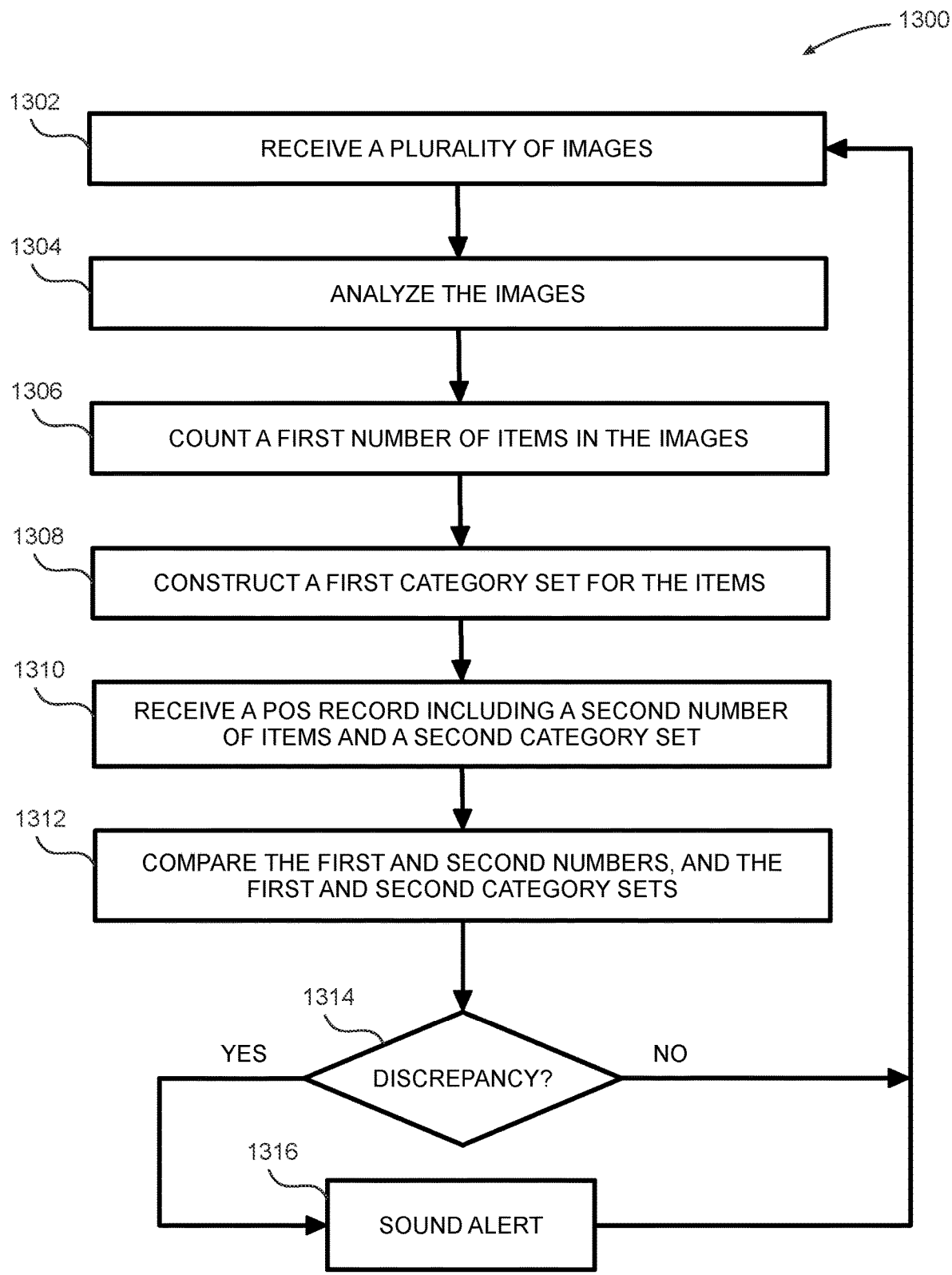
FIG. 13 is a flow diagram depicting a method to perform a self-checkout verification.

FIG. 13 is a flow diagram depicting a method 1300 to perform a self-checkout verification. Method 1300 may be executed by software (e.g., AI/ML/CV algorithms) running on processing system 106.

Method 1300 may include receiving a plurality of images (1302). For example, processing system 106 may receive images 122 from camera 102. Method 1300 may include analyzing the images (1304). For example, one or more AI/ML/CV algorithms running on processing system may analyze the images to detect, for example, customer 116, a hand or hands of customer 116, shopping cart 110, and items 114, 112, and 120.

Method 1300 may include counting a first number of items in the images (1306). For example, processing system 106 may determine a number of items being checked out by customer 116 based on the analysis. Method 1300 may include constructing a first category set for the items (1308). Constructing the first category set may include identifying the kinds of items being purchased based on the analysis. This category set may be comprised of groups of items belonging to a similar category (e.g., produce, dairy, meat, seafood, health/vitamins, etc.).

Method 1300 may include receiving a POS record including a second number of items and a second category set (1310). For example, processing system may receive POS record 124 from POS system 118. This POS record includes a count of items checked out by customer 116 (i.e., the second number of items), and a second category set based on the checked out items. In one aspect, POS record 124 is generated by POS system 118. POS system may generate the second number of items and the second category set as a part of POS record 124. Alternatively, processing system 106 may compute the second number of items and generate the second category set based on data contained in POS record 124.

Method 1300 may include comparing the first and second numbers, and the first and second category sets (1312). For example, processing system 106 may be configured to perform this comparison. Method 1300 may include determine whether there is a discrepancy between the first and second numbers, or the first and the second category sets (1314). If there is no discrepancy, the method goes back to 1302 to process the next customer transaction. If, at 1314, processing system 106 detects a discrepancy, then method 1300 goes to 1316, where the method sounds an alert. For example, processing system 106 may sound alarm 108. The method then returns to 1302.

Figure 14A:
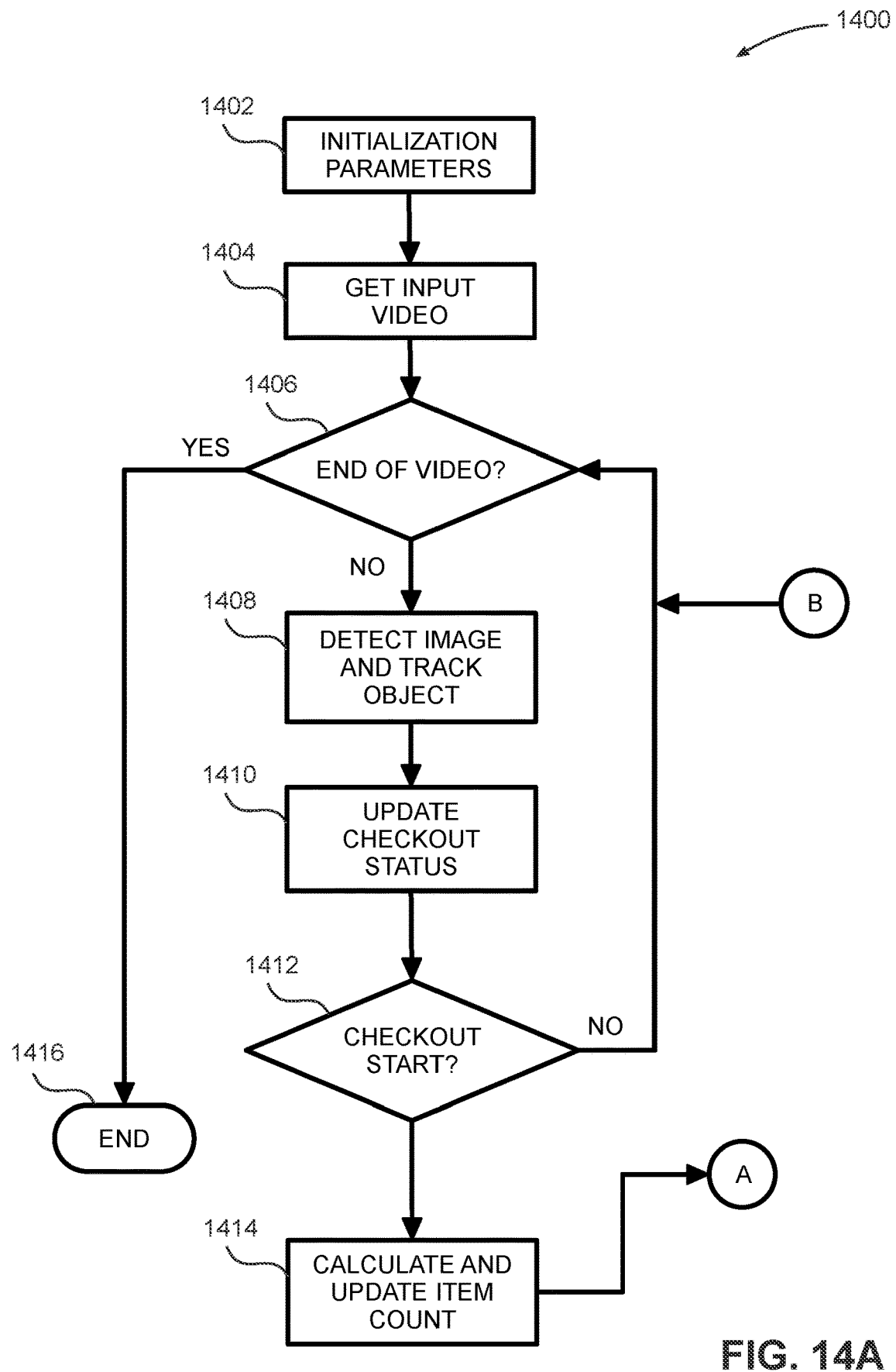
FIGS. 14A and 14B are flow diagrams depicting a method to perform a self-checkout verification.
Figure 14B:
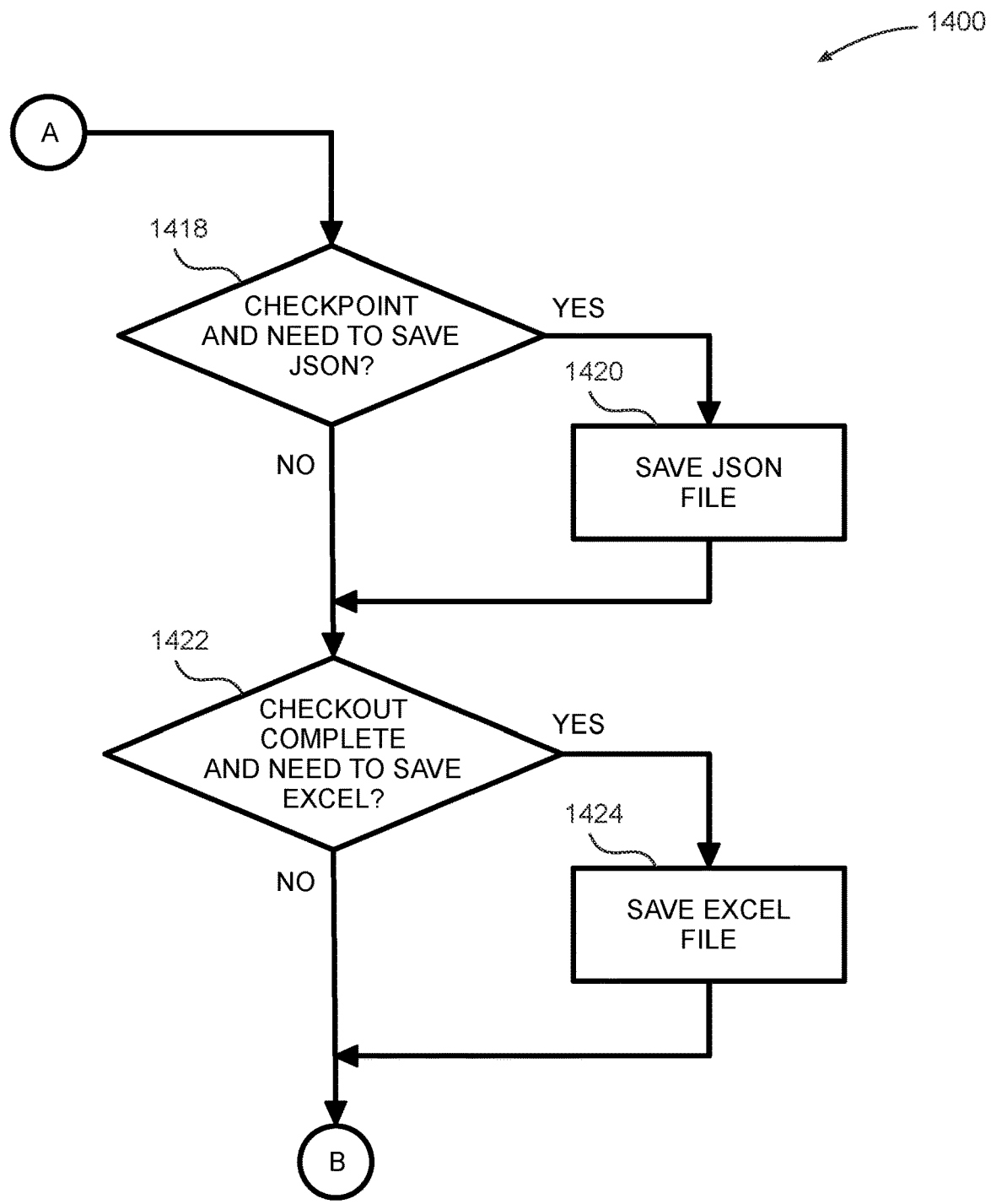

FIGS. 14A and 14B are flow diagrams depicting a method 1400 to perform a self-checkout verification. Method 1400 may be executed by software (e.g., AI/ML/CV algorithms) running on processing system 106.

Method 1400 may include receiving one or more initialization parameters (1402). For example, processing system 106 may receive initialization parameters for camera 102.

Method 1400 may include getting (e.g., receiving) input video (1404). For example, processing system 106 may receive a video stream from camera 102, as images 122. Method 1400 may include determining whether the video stream is at an end point (1406). If the video stream has ended, then method 1400 goes to 1416, where the method ends.

If, at 1406, the video stream is not at an end point, then the method goes to 1408, which includes detecting an image and tracking an object in the image (1408). For example, processing system 106 may detect and process images 122, and identify and track one or more objects in images 122. For example, processing system 106 may be configured to detect and track any combination of shopping cart 110, customer 116, items 112, 114 and 120, hand 506, item 502, and so on.

Method 1400 may include updating a checkout status (1410). For example, processing system 106 might analyze images 122 to determine whether customer 116 has started a checkout process.

Method 1400 may include determining a start of the checkout process (1412). If, at 1412, method 1400 determines that the checkout process has not started, the method returns to 1406. If, at 1412, method 1400 determines that the checkout process has started, then the method goes to 1414, which includes calculating and updating item count. For example, processing system 106 may implement 1412 and 1414, where 1414 may be similar to counting the first number of the items, categorizing each item, and constructing the first category set including the categorizing for all the items.

Method 1400 may include determining whether to save a JSON file at a checkpoint (1418). For example, processing system 106 may determine whether to save a JSON file at the checkpoint. If the JSON file needs to be saved, method 1400 saves the JSON file at 1420, and goes to 1422. If the JSON file does not need to be saved, method 1400 goes from 1418 to 1422.

Method 1400 may include determining whether to save an Excel file at a completion of the customer self-checkout process (1422). For example, processing system 106 may determine whether to save an Excel file at the completion of the self-checkout process. If the Excel file needs to be saved, method 1400 saves the Excel file at 1424, and returns to 1406. If the Excel file does not need to be saved, method 1400 returns from 1422 to 1406.

Figure 15:
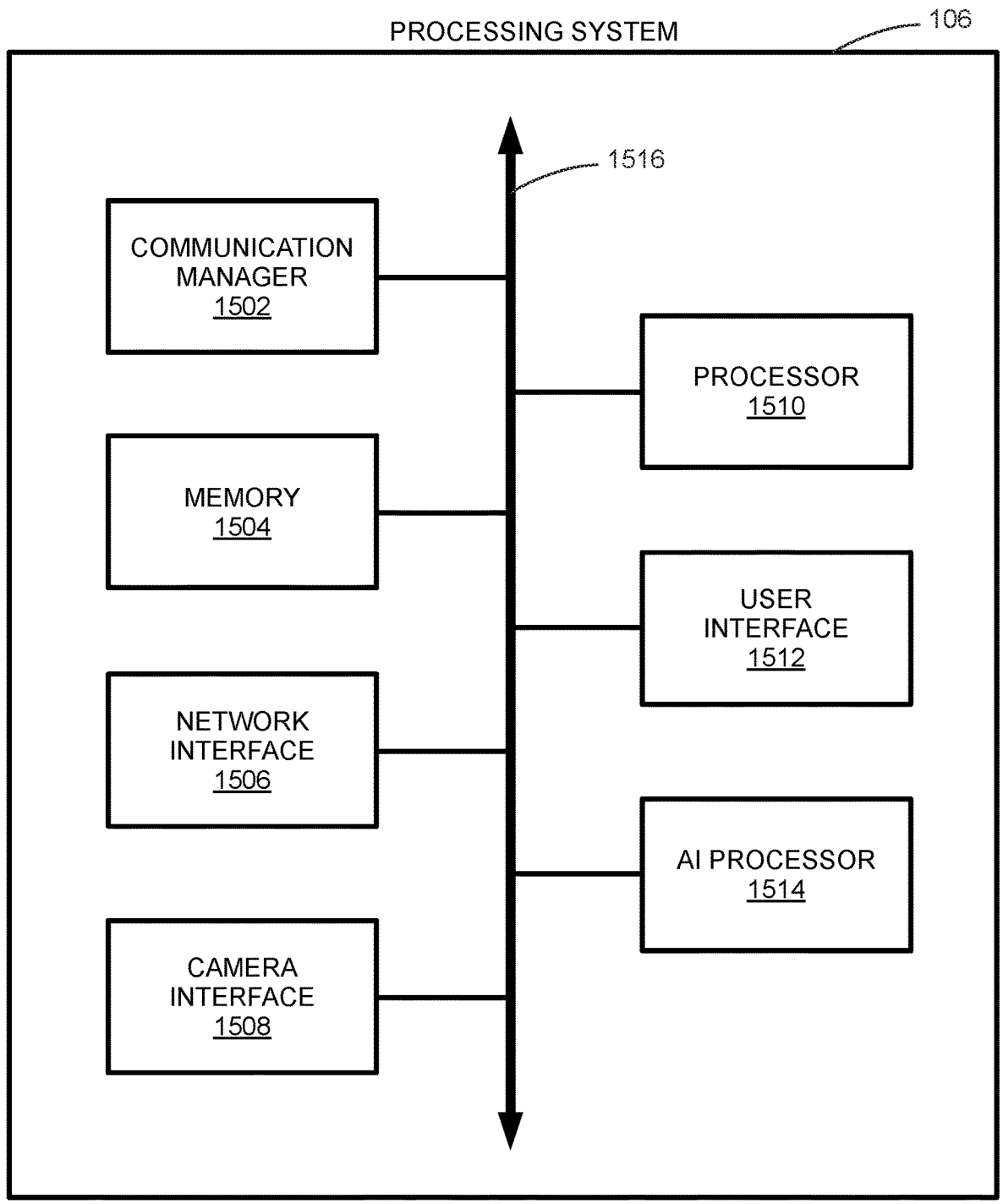
FIG. 15 is a block diagram depicting an embodiment of a processing system.

FIG. 15 is a block diagram depicting an embodiment of processing system 106. As depicted, processing system includes communication manager 1502, memory 1504, network interface 1506, camera interface 1508, processor 1510, user interface 1512, and AI processor 1514.

In one aspect, communication manager 1502 is configured to manage communication protocols and associated communication with external peripheral devices as well as communication with other components in processing system 106. For example, communication manager 1502 may be responsible for generating and maintaining a communication interface between processing system 106 and POS system 118.

In an aspect, memory 1504 is configured to store data associated with self-checkout verification system 100. For example, memory 1504 may store images 122 and POS record 124. Memory 1504 may include both long-term memory and short-term memory. Memory 1504 may be comprised of any combination of hard disk drives, flash memory, random access memory, read-only memory, solid state drives, and other memory components.

In one aspect, network interface 1506 is configured to communicatively couple processing system 106 with a computer network. Network interface 1506 may enable processing system 106 to connect to a store network that may be an Ethernet network, a Wi-Fi network, a Bluetooth connection, etc. Network interface 1506 may be used by processing system to communicate with employee devices (e.g., computing systems, tablets, mobile devices, etc.) via a suitable wired or wireless interface.

In an aspect, camera interface 1508 is used to interface processing system 106 with camera 102. Camera interface 1508 may be a MIPI interface, a USB interface, a FireWire interface, or any other kind of communication interface. In another aspect, camera 102 may be configured to interface with processing system 106 via a wireless interface such as Wi-Fi, Bluetooth, ZigBee, etc.

In an aspect, processor 1510 is configured to perform functions that may include generalized processing functions, arithmetic functions, and so on. Processor 1510 is configured to process information associated with the systems and methods described herein.

In an aspect, user interface 1512 allows a user to interact with embodiments of the systems described herein. User interface 1512 may include any combination of user interface devices such as a keyboard, a mouse, a trackball, one or more visual display monitors, touchscreens, incandescent lamps, LED lamps, audio speakers, buzzers, microphones, push buttons, toggle switches, and so on.

In an aspect, AI processor 1514 implements one or more AI/CV/ML algorithms associated with the systems and methods described herein. For example, AI processor 1514 may be configured to implement functions such as hand region detection 702, panoptic segmentation 706, cart region detection/crop 802, panoptic segmentation 804, etc.

Data bus 1516 communicatively couples the different components of processing system 106, and allows data and communication messages to be exchanged between these different components.

Figure 16:
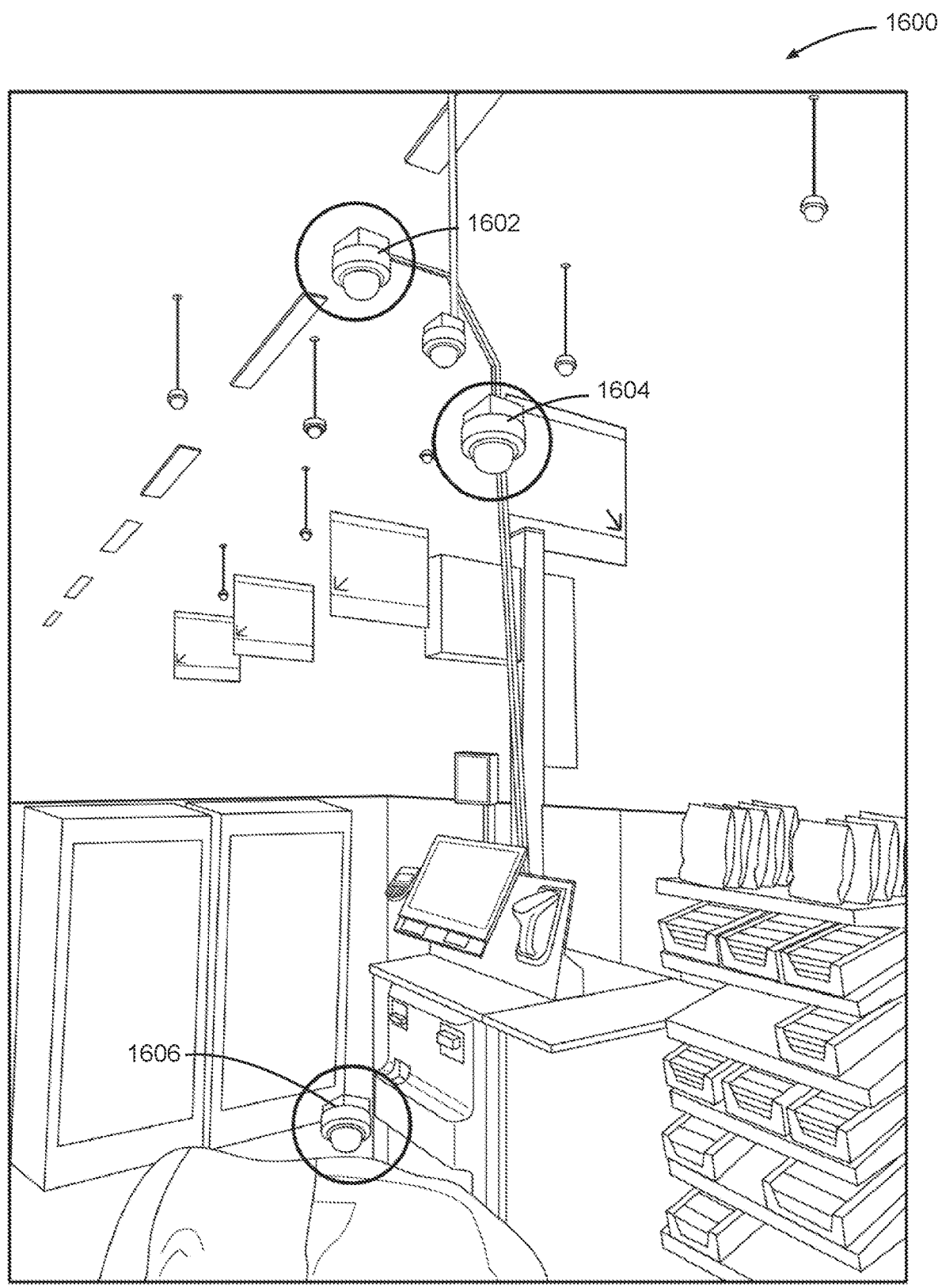
FIG. 16 is a schematic diagram depicting a camera installation.

FIG. 16 is a schematic diagram depicting a camera installation 1600. As depicted, camera installation 1600 includes cameras 1602, 1604 and 1606. Each of camera 1602, 1604 and 1606 may perform functions similar to camera 102. These cameras may be mounted above and in view of a POS terminal (e.g., POS system 118). Cameras 1602, 1604, and 1606 may be mounted with appropriate camera placement and orientation to generate high item counting detection output. The fields of view of 1602, 1604, and 1606 may be arranged to reduce errors in the AI/ML/CV algorithms running on processing system 106.

Figure 17:
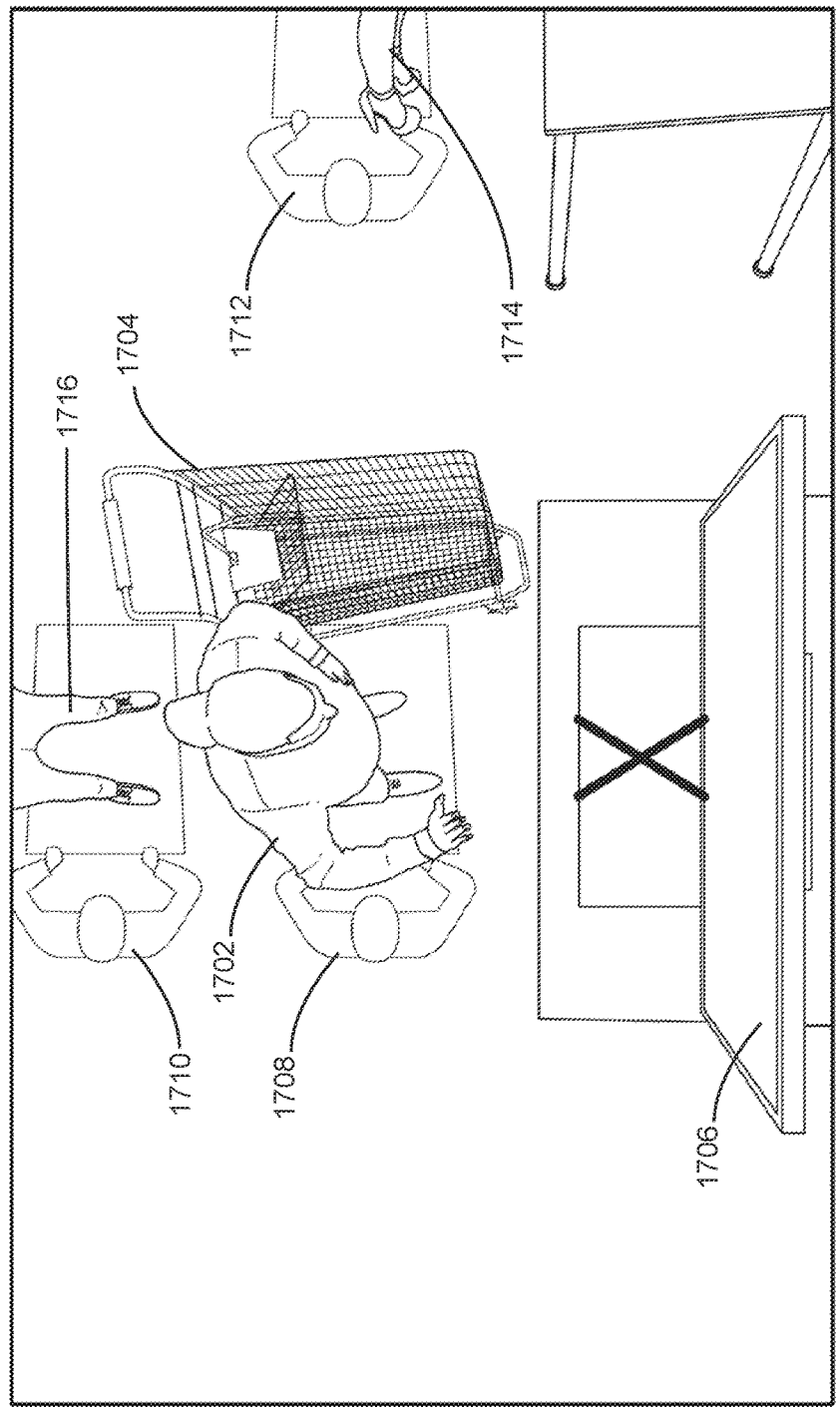
FIG. 17 is a view of a customer self-checkout process.

FIG. 17 is a view 1700 of a customer self-checkout process. View 1700 may be captured by, for example, any combination of cameras 102, 1602, 1604, and 1606. View 1700 depicts customer 1702 with shopping cart 1704 engaged in a self-checkout process, at POS terminal/system 1706. The "X" symbol indicates a camera installation aiming point. View 1700 may be an image as processed by processing system 106. The AI/ML/CV algorithms running on processing system 106 may detect and delineate customer 1702, customer 1714, and customer 1716 with bounding boxes/identifiers 1708, 1712, and 1710 respectively.

Figure 18:
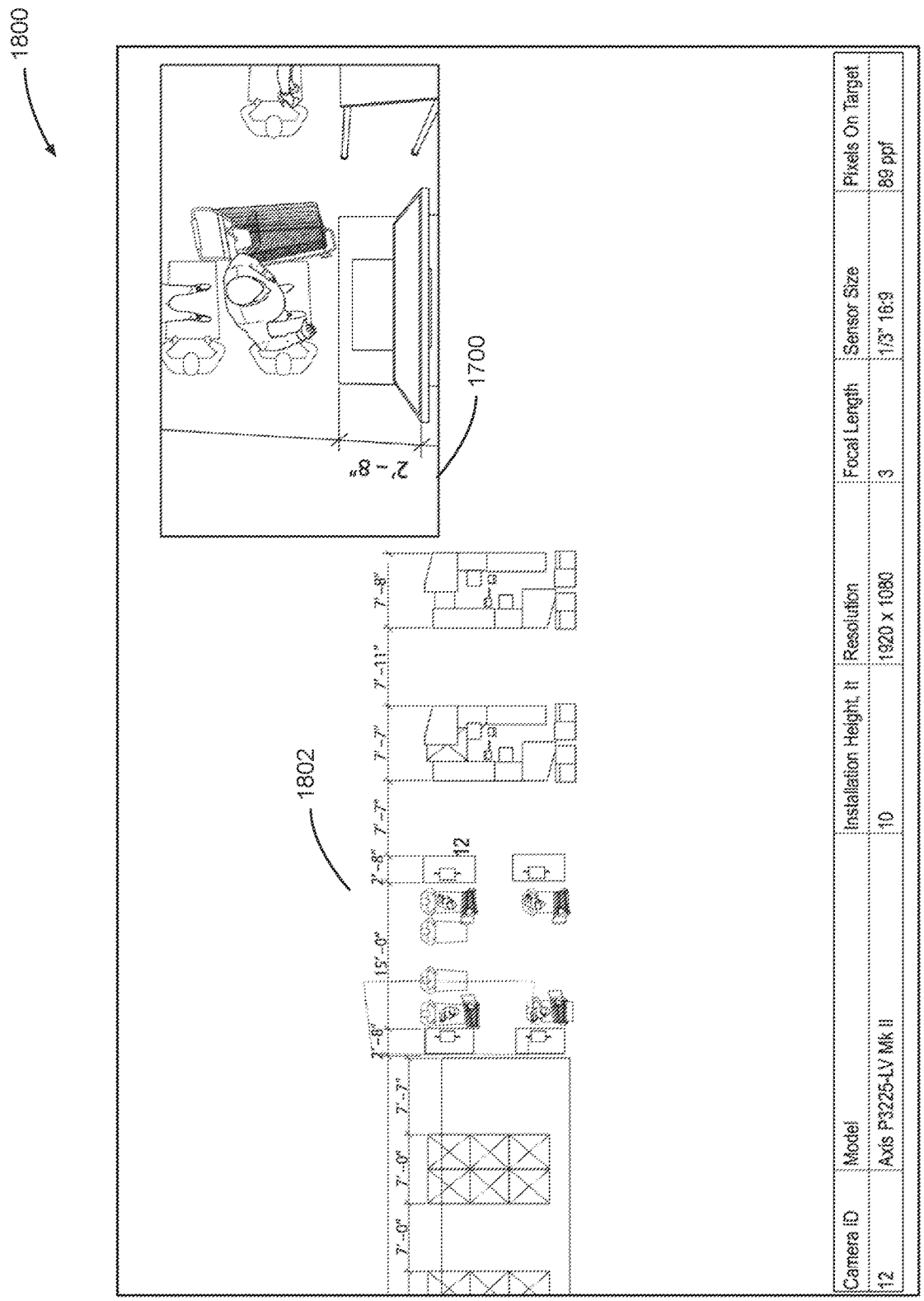
FIG. 18 is a screenshot depicting data presented by a selected camera.

FIG. 18 is a screenshot 1800 depicting data presented by a selected camera. As depicted, screenshot 1800 includes view 1700, captured by camera number 12 (Camera ID indicated as 12 in the screenshot) in the store. Screenshot 1800 may be displayed to a store employee monitoring one or more self-checkout POS systems via a visual display monitor. Other data included in screenshot 1800 is a map of the self-checkout section of the store indicating which camera view 1700 is generated from, a model of the camera, an installation height of the camera in feet, an image resolution output by the camera, a focal length associated with the camera, a sensor size associated with the camera, and a number of pixels on a target region being monitored on by the camera.

One possible camera configuration that may be used for installing camera 102 to obtain appropriate camera placement and orientation workflow is:

Height: 10 ft above the ground.
Location: Above and centered to the edge of the table/ POS terminal/system platform. The symbol "X" in view 1700 Indicates the camera installation location.
Visibility: Checkout Monitor, Scanner, POS Device.
Metrics: Item Counting, Product SKU recognition.
Self-checkout verification system 100 may provide the following features:
Self-checkout offers the benefits of a contactless shopping experience, allows for proper social distancing, and avoids the need for manual aisles in busy stores with limited staff as seen, for example, during the COVID-19 pandemic. Self-checkout verification system 100 can verify if purchased goods match the actual goods the customer actually takes with them, thereby preventing the loss of goods and reducing the loss for retailers.
Self-checkout verification system 100 can integrate security cameras on cashiers and self-checkout machines, which can automatically and accurately detect whether items and/or goods are missed.
The AI algorithms running on processing system 106 classify one or more actions that occur at the checkout location by taking video data and POS stream data. This classification gives retailers access to POS data combined with loss event information. The retailers can use this data and information to identify all sources of loss and their impact on the entire operation.
Self-checkout verification system 100 can detect various types of checkout scenarios such as A) Products that are bought to the counter in the cart or basket, and/or B) Products that are bought to the counter held in a hand or hands of the customer. Self-checkout verification system 100 detects and counts the number of products that customers intend to checkout via AI/ML/CV, algorithms and maps this number to the POS count, thereby creating a real-time matching for product checkout accuracy. This helps in flagging potential fraudulent checkouts where the customer attempts to skip the scanning of one or more of the products being checked out.

A general workflow associated with self-checkout verification system 100 is as follows.

First, camera deployment and capture video stream.

The cameras needed by self-checkout verification system 100 do not need to be re-installed; existing surveillance cameras located above the self-checkout machines (POS terminals/systems) can be used. In one aspect, a camera such as camera 102 has a frame rate of 25 frames per second, which can ensure a complete and detailed analysis by the detection algorithm and record the customer's self-checkout process.

Second, Initialize all system parameters and capture the video stream from camera (e.g., 1402 and 1404).

Third, the system uses object segmentation technology and target tracking technology to detect and track goods on each frame of the video stream to get the count of goods and the major type of goods (e.g., 1304, 1408).

The process details are as follows:
Self-checkout verification system 100 the start of self-checkout process:
When there is a shopping cart detected by the algorithm from the camera image or when there are customers detected by the algorithm in consecutive multi-frame images, the self-checkout process starts (e.g., 1412, 206).
Self-checkout verification system 100 detects the number of checkout commodities using segmentation and tracking technologies:
The algorithm first detects the presence of hand-held items and shopping carts in the image (e.g., as shown in camera images 500 and 600, method 300).
Then, the algorithm extracts the detected handhold item image area and shopping cart image area,
The algorithm may use image segmentation algorithm on the extracted areas, do instance counting to get a number of items (e.g., 700 and 800).
The algorithm may compute an instance count which is sum of the number of items in hand and the number of items in the shopping cart (e.g., 1414).
The system detects the end of self-checkout process:
When there is a bill detected by the algorithm from the camera image, the self-checkout process complete (e.g., 900).
Oriented Bounding Box Detection: Based on advanced object detection algorithms, the algorithm implemented on self-checkout verification system 100 not only detects the position of the items, but also their orientation. This enables the algorithm to calculate more accurate predictions and lower latency as shown in 1100 and 1200.
Self-checkout verification system 100 outputs the total number of commodities (items) and commodity category in this checkout.
Self-checkout verification system 100 can use the format of Excel and/or JSON files to save the output including the total number of commodities and commodity category. Self-checkout verification system 100 may save the commodity category, commodity quantity, start checkout time and complete checkout time in any combination of Excel and/or JSON files (1418, 1420, 1422, and 1424).

Item count and POS record matching: Self-checkout verification system 100 may compare the consistency of total number of goods between the AI system (i.e., an output generated by the AI/ML/CV algorithms running on processing system 106) and outputs generated by POS system 118 (e.g., POS record 124). If the algorithm determines that there is a discrepancy between the two numbers (i.e., if the two numbers are not consistent), processing system 106 may trigger alarm 108. In response, one or more employees or store staff members may be alerted to check the situation (e.g., 1316, method 1300).

If the number of items as determined by the AI/ML/CV algorithms on processing system 106 is more than the POS count, a red alert signal may be generated. If the item count as determined by the AI/ML/CV algorithms is less than the POS count, the yellow alert signal may be generated (e.g., 1000).

Self-checkout verification system 100 may be configured to detect a start of next self-checkout process after the current customer's checkout is completed, and the above-mentioned identification operation will be performed again when the next customer starts to checkout.

Self-checkout verification system 100 may save the Excel and JSON files generated during the operation to record relevant information, so that managers can view and retrieve relevant checkout details, which can provide a basis and guidance for product loss prevention.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
receiving a plurality of images from a camera, wherein the images are associated with a customer self-checkout process;
analyzing the images, the analyzing further comprising:
detecting one or more items in possession of the customer;
counting a first number of the items;
categorizing each item, wherein the categorizing includes identifying each item; and
constructing a first category set including the categorizing for all the items;
receiving a point-of-sale record at a completion of the self-checkout process, wherein the point-of-sale record includes a second number of the items and a second category set including the categorizing for all the items;
comparing the first number and the second number, and the first category set and the second category set; and
generating an alert if there is a discrepancy between the first number and the second number, or between the first category set and the second category set, wherein generating the alert further includes:
generating a yellow alert if the first number is less than the second number, wherein the yellow alert indicates a possibility that the customer has scanned at least one item multiple times during the self-checkout process; and
generating a red alert if the first number is greater than the second number, wherein the red alert indicates a possibility that the customer has not scanned at least one item during the self-checkout process.

2. The method of claim 1, wherein the items are located in a container associated with the customer or in one or both hands of the customer.

3. The method of claim 2, wherein the container is any of a shopping cart, a shopping basket, or a shopping bag.

4. The method of claim 1, wherein the analyzing is performed by a machine learning algorithm.

5. The method of claim 1, wherein the camera is a video camera.

6. The method of claim 5, wherein the camera is a store surveillance camera.

7. The method of claim 1, wherein the detecting and counting are performed using panoptic segmentation.

8. The method of claim 1, wherein the completion of the self-checkout process is indicated by a generation of point-of-sale record.

9. The method of claim 1, further comprising detecting a start of a subsequent self-checkout process after the completion of the self-checkout process.

10. The method of claim 1, further comprising detecting a start of the self-checkout process and the completion of the self-checkout process.

11. The method of claim 1, wherein the detecting is performed using panoptic segmentation.

12. The method of claim 1, further comprising:
delineating each item in an image with a bounding box; and
delineating each item in the image with a descriptive label.

13. An apparatus comprising:
a camera configured to generate a plurality of images associated with a customer self-checkout process;
a point-of-sale system where the customer performs the self-checkout; and
a processing system configured to:
receive a plurality of images from the camera;
analyze the images, and based on the analysis;
detect one or more items in possession of the customer;
count a first number of the items;
categorize each item, wherein the categorizing includes identifying each item; and
construct a first category set including the categorizing for all the items;
receive a point-of-sale record from the point-of-sale system at a completion of the self-checkout process, wherein the point-of-sale record includes a second number of the items and a second category set including the categorizing for all the items;
compare the first number and the second number, and the first category set and the second category set; and
generate an alert if there is a discrepancy between the first number and the second number, or between the first category set and the second category set, wherein the alert further includes:
a yellow alert if the first number is less than the second number, wherein the yellow alert indicates a possibility that the customer has scanned at least one item multiple times during the self-checkout process; and a red alert if the first number is greater than the second number, wherein the red alert indicates a possibility that the customer has not scanned at least one item during the self-checkout process.

14. The apparatus of claim 13, wherein the items are located in a container associated with the customer or in one or both hands of the customer.

15. The apparatus of claim 14, wherein the container is any of a shopping cart, a shopping basket, or a shopping bag.

16. The apparatus of claim 13, wherein the analysis is performed by a machine learning algorithm.

17. The apparatus of claim 13, wherein the camera is a video camera.

18. The apparatus of claim 17, wherein the camera is a store surveillance camera.

19. The apparatus of claim 13, wherein the detecting and counting are performed using panoptic segmentation.

20. The apparatus of claim 13, wherein the completion of the self-checkout process is indicated by a generation of point-of-sale record.

21. The apparatus of claim 13, further comprising detecting a start of a subsequent self-checkout process after the completion of the self-checkout process.

22. The apparatus of claim 13, further comprising detecting a start of the self-checkout process and the completion of the self-checkout process.

23. The apparatus of claim 13, wherein the detecting is performed using panoptic segmentation.

24. The apparatus of claim 13, wherein the processing system:
   delineates each item in an image with a bounding box; and
   delineates each item in the image with a descriptive label.

\* \* \* \* \*